United States Patent
Kim et al.

(10) Patent No.: US 11,230,224 B2
(45) Date of Patent: Jan. 25, 2022

(54) LAMP FOR VEHICLE

(71) Applicant: SL Corporation, Daegu (KR)

(72) Inventors: Hyeong Do Kim, Gyengsangbuk-do (KR); Jong Woon Kim, Gyengsangbuk-do (KR); Chang Ho Ryu, Gyengsangbuk-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/693,030

(22) Filed: Nov. 22, 2019

(65) Prior Publication Data

US 2020/0180504 A1 Jun. 11, 2020

(30) Foreign Application Priority Data

Dec. 5, 2018 (KR) .................. 10-2018-0154980
Dec. 6, 2018 (KR) .................. 10-2018-0156065

(51) Int. Cl.
| | | |
|---|---|---|
| *B60Q 1/14* | (2006.01) | |
| *F21S 41/153* | (2018.01) | |
| *F21S 41/143* | (2018.01) | |
| *F21S 41/20* | (2018.01) | |
| *F21S 41/663* | (2018.01) | |
| *F21W 102/14* | (2018.01) | |
| *F21S 43/14* | (2018.01) | |

(Continued)

(52) U.S. Cl.
CPC ......... *B60Q 1/1415* (2013.01); *B60Q 1/1438* (2013.01); *F21S 41/143* (2018.01); *F21S 41/153* (2018.01); *F21S 41/285* (2018.01); *F21S 41/663* (2018.01); *F21S 43/14* (2018.01); *F21S 43/15* (2018.01); *F21S 43/26* (2018.01); *B60Q 2300/054* (2013.01); *B60Q 2300/41* (2013.01); *B60Q 2300/42* (2013.01); *F21W 2102/14* (2018.01)

(58) Field of Classification Search
CPC .................................................... F21S 41/153
See application file for complete search history.

(56) References Cited

U.S. PATENT DOCUMENTS

| | | | |
|---|---|---|---|
| 10,596,956 B1 * | 3/2020 | Ahn | F21S 45/47 |
| 10,655,812 B2 * | 5/2020 | Motohashi | F21S 41/151 |

(Continued)

FOREIGN PATENT DOCUMENTS

| | | |
|---|---|---|
| DE | 20 2011 000 481 U1 | 6/2011 |
| DE | 10 2013 110 272 A1 | 3/2015 |

(Continued)

OTHER PUBLICATIONS

Coefficients of linear thermal expansion, Jul. 11, 2017, the engineering tool box (Year: 2017).*

(Continued)

*Primary Examiner* — Jong-Suk (James) Lee
*Assistant Examiner* — Eric T Eide
(74) *Attorney, Agent, or Firm* — Nelson Mullins Riley & Scarborough LLP; Jhongwoo Peck

(57) ABSTRACT

A lamp for a vehicle includes a light source unit that generates light and an optical unit for guiding the light. The light source unit includes a plurality of light sources arranged in a matrix shape, and the optical unit includes a plurality of optical members disposed in a traveling direction of the light. The light generated from the plurality of light sources passes through the optical unit to form a beam pattern.

29 Claims, 28 Drawing Sheets

(51) Int. Cl.
*F21S 43/20* (2018.01)
*F21S 43/15* (2018.01)

(56) References Cited

U.S. PATENT DOCUMENTS

| | | | |
|---|---|---|---|
| 2014/0175978 A1* | 6/2014 | Kobayashi | F21S 41/18 |
| | | | 315/82 |
| 2014/0264395 A1 | 9/2014 | Lee et al. | |
| 2017/0114975 A1* | 4/2017 | Hiki | F21S 41/19 |
| 2017/0328535 A1* | 11/2017 | Yagi | F21S 41/663 |
| 2018/0087732 A1* | 3/2018 | De Lamberterie | B60Q 1/16 |
| 2018/0128442 A1* | 5/2018 | Suwa | F21S 41/40 |
| 2019/0016251 A1* | 1/2019 | Pellarin | F21S 41/663 |
| 2019/0113197 A1* | 4/2019 | Kamiya | F21S 41/143 |
| 2019/0120457 A1* | 4/2019 | Alisafaee | F21S 41/336 |
| 2019/0170310 A1* | 6/2019 | Park | F21S 41/148 |
| 2019/0257492 A1 | 8/2019 | Motohashi | |
| 2019/0339496 A1* | 11/2019 | Won | G02B 19/0014 |

FOREIGN PATENT DOCUMENTS

| | | |
|---|---|---|
| DE | 10 2017 105 888 A1 | 9/2018 |
| DE | 10 2018 008 760 A1 | 4/2019 |
| DE | 10 2019 202 434 A1 | 8/2019 |
| DE | 10 2018 220 819 A1 | 4/2020 |

OTHER PUBLICATIONS

English Translation of First Office Action in German counterpart application DE 10 2019 218 776.5 dated Aug. 30, 2021.

\* cited by examiner

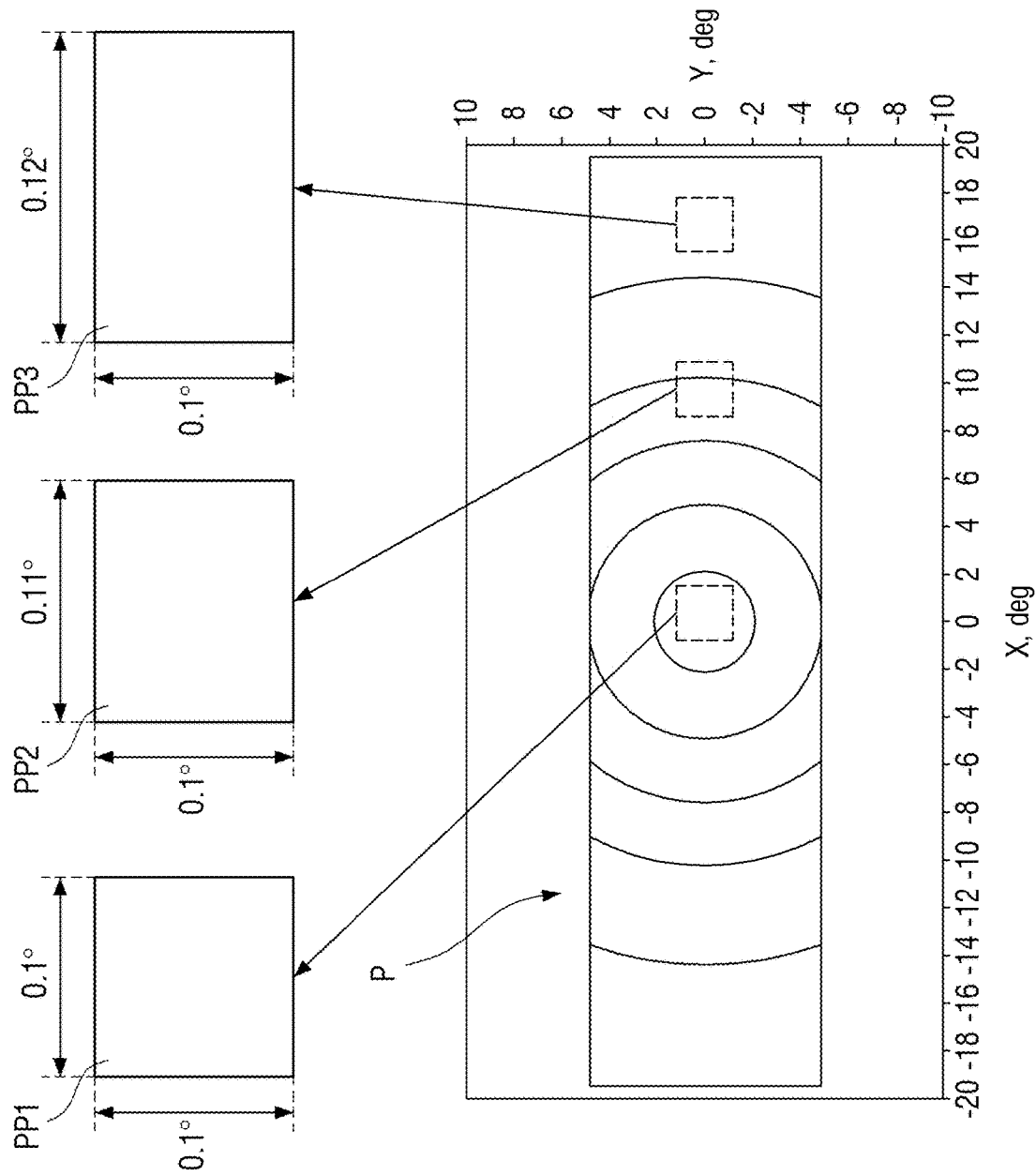

|  | Center | Out Edge |
|---|---|---|
| Light Receiving Angle | ±60° | ±60° |

|  | Lens NO.1 | Lens NO.3 |
|---|---|---|
| Diameter | 13.82mm | 30.8mm |

|    | 1    | 2    | 3   | 4    | 5    |
|----|------|------|-----|------|------|
| cd | 1354 | 1652 | 980 | 1224 | 1535 |

| | Center | Out Edge |
|---|---|---|
| Light Receiving Angle | ±60° | ±20° |

| | Lens NO.1 | Lens NO.3 |
|---|---|---|
| Diameter | 11.6mm | 23mm |

| | 1 | 2 | 3 | 4 | 5 |
|---|---|---|---|---|---|
| cd | 186 | 110 | 80 | 156 | 210 | ated herein by reference in their entirety.

LAMP FOR VEHICLE

CROSS-REFERENCE TO RELATED APPLICATION

This application claims the benefit of priority from Korean Patent Application Nos. 10-2018-0154980 filed on Dec. 5, 2018 and 10-2018-0156065 filed on Dec. 6, 2018, which applications are herein incorporated by reference in their entirety.

BACKGROUND

1. Technical Field

The present disclosure relates to a lamp for a vehicle, and more particularly, to a lamp for a vehicle for forming a high resolution beam pattern using a plurality of light sources, a plurality of optical members, and a shield member.

2. Description of the Related Art

Generally, a vehicle is equipped with various types of vehicle lamps having an illumination function to aid recognizing an object in the vicinity of the vehicle at low-light conditions (e.g., nighttime), and a signal function for notifying other vehicle or road users of the operating state of the vehicle. For example, a vehicle is generally equipped with a headlamp and a fog lamp for the purpose of the illumination function, and a turn signal lamp, a tail lamp, a brake lamp, side markers for the signal functions, or the like. These vehicle lamps are stipulated by laws and regulations for their installation standards and specifications to allow each function to be fully utilized. Among the lamps for the vehicle, the headlamp forms a low beam pattern or a high beam pattern to secure a driver's forward view when operating the vehicle in a low-light environment such as at night, and it provides an important role in safe driving.

The lamps for the vehicle are provided with a lamp module having a headlamp for selectively forming a low beam pattern or a high beam pattern depending on the provision of the shield member. In some cases, a headlamp that forms a low beam pattern and a headlamp that forms a high beam pattern may be provided as separate lamp modules.

The lamp for the vehicle usually maintains a low beam pattern in order to prevent causing glare to the driver of an oncoming vehicle or a preceding vehicle and forms a high beam pattern as needed when driving at high speeds or when driving in low-light environment, thereby improving safety.

Accordingly, in recent years, Adaptive Driving Beam (ADB) headlamps, i.e., adaptive headlamps, are provided, in which when the oncoming vehicle or the preceding vehicle is detected while driving with the high beam pattern formed, the ADB headlamp automatically adjusts the lamp's light illumination angle, brightness, width, length, or the like, thereby preventing causing glare to the driver of the oncoming or preceding vehicle.

However, when a shadow zone is formed in the beam pattern to prevent glare to the driver according to the configuration, the shadow zone is formed in a large portion of the formed beam patterns, and the forward view may be insufficiently secured.

SUMMARY

Aspects of the present disclosure provide a lamp for a vehicle for forming a high resolution beam pattern. Aspects of the present disclosure provide a lamp for a vehicle that forms a low beam pattern and a beam pattern having a shadow zone. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure a lamp for a vehicle may include a light source unit that generate light and an optical unit for guiding the light. The light source unit may include a plurality of light sources arranged in a matrix shape, and the optical unit may include a plurality of optical members disposed in a traveling direction of the light. The light generated from the plurality of light sources may pass through the optical unit to form a beam pattern.

A lamp for a vehicle according to an exemplary embodiment of the present disclosure has one or more of the following benefits. By using a light source unit with about 1,000 or more light sources, a high resolution beam pattern may be formed. When the light source unit is rotated about a central axis of the light source unit to allow one side of the light source unit to be inclined, a cut-off area of the low beam pattern may be efficiently formed. As the shield member shields an aberration and/or a part of the light generated by the light source unit, a beam pattern having a bright center and high resolution may be formed.

The benefits of the present disclosure are not limited to the above-mentioned benefits, and other benefits not mentioned may be clearly understood by a person skilled in the art from the claims.

BRIEF DESCRIPTION OF THE DRAWINGS

The above and other aspects and features of the present disclosure will become more apparent by describing in detail exemplary embodiments thereof with reference to the attached drawings, in which:

FIG. 8 shows first to third pixel beam patterns of an exemplary embodiment of the present disclosure;

DETAILED DESCRIPTION

Figure 1:
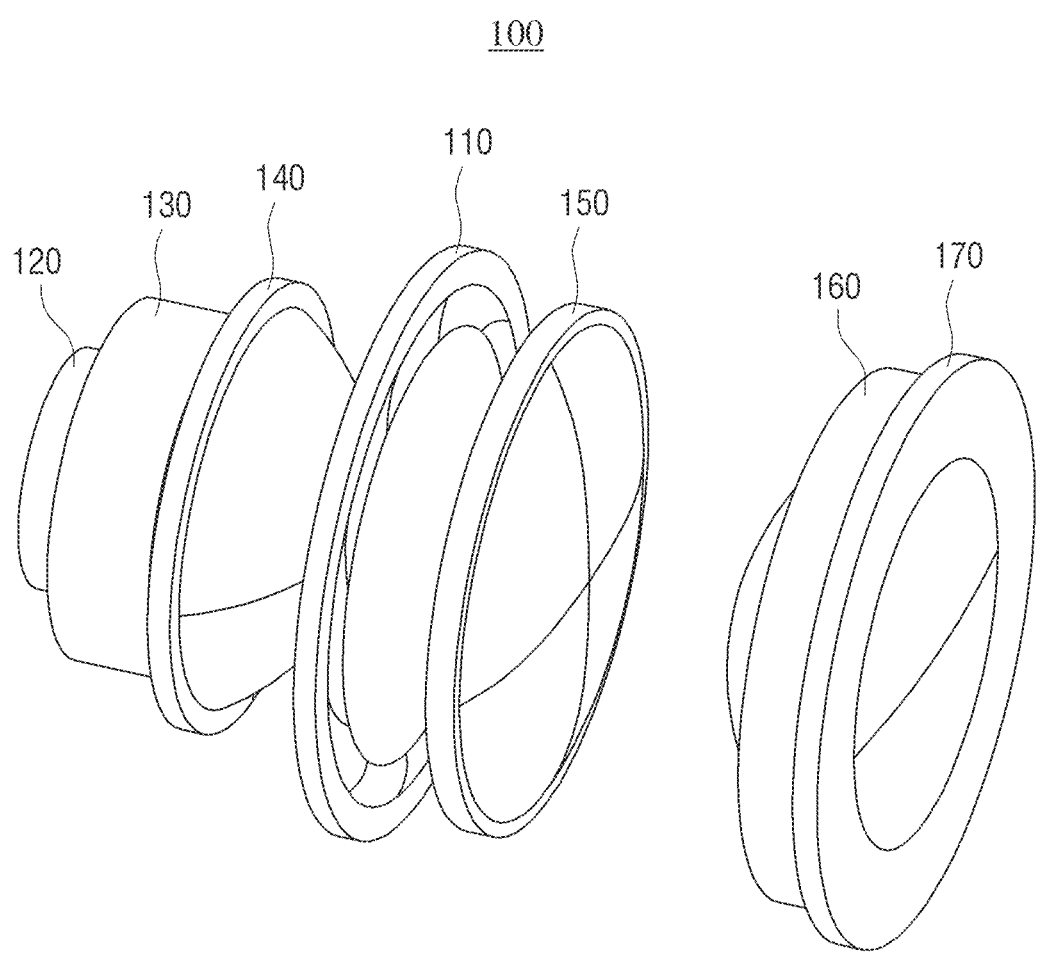
FIG. 1 shows a lamp for a vehicle according to an exemplary embodiment of the present disclosure.

Advantages and features of the present disclosure and methods of accomplishing the same may be understood more readily by reference to the following detailed description of preferred exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present disclosure will only be defined by the appended claims. Throughout the specification, like reference numerals in the drawings denote like elements. In some exemplary embodiments, well-known steps, structures and techniques will not be described in detail to avoid obscuring the disclosure.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure are described herein with reference to plan and cross-sectional illustrations that are schematic illustrations of idealized exemplary embodiments of the present disclosure. As such, variations from the shapes of the illustrations as a result, for example, of manufacturing techniques and/or tolerances, are to be expected. Thus, exemplary embodiments of the present disclosure should not be construed as limited to the particular shapes of regions illustrated herein but are to include deviations in shapes that result, for example, from manufacturing. In the drawings, respective components may be enlarged or reduced in size for convenience of explanation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of a lamp for a vehicle according to the present disclosure will be described in detail with reference to the accompanying drawings.

Figure 2:
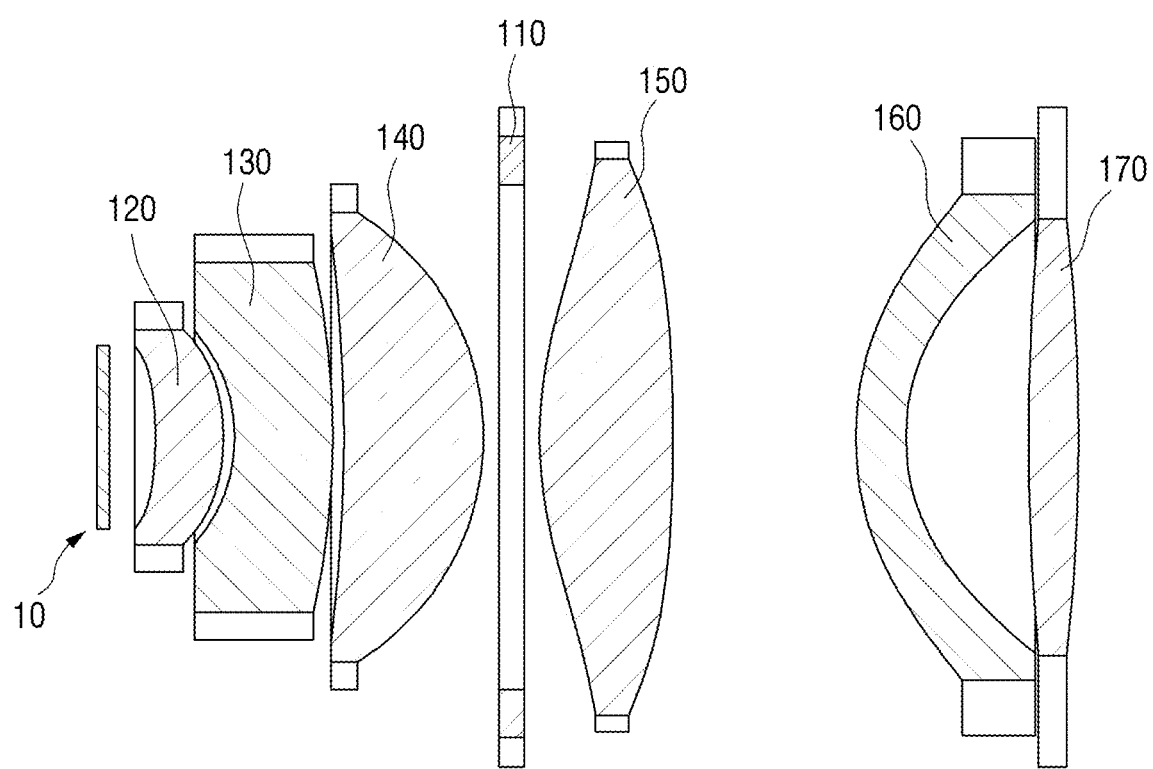
FIG. 2 is a cross-sectional view of a lamp for a vehicle according to an exemplary embodiment of the present disclosure.
Figure 3:
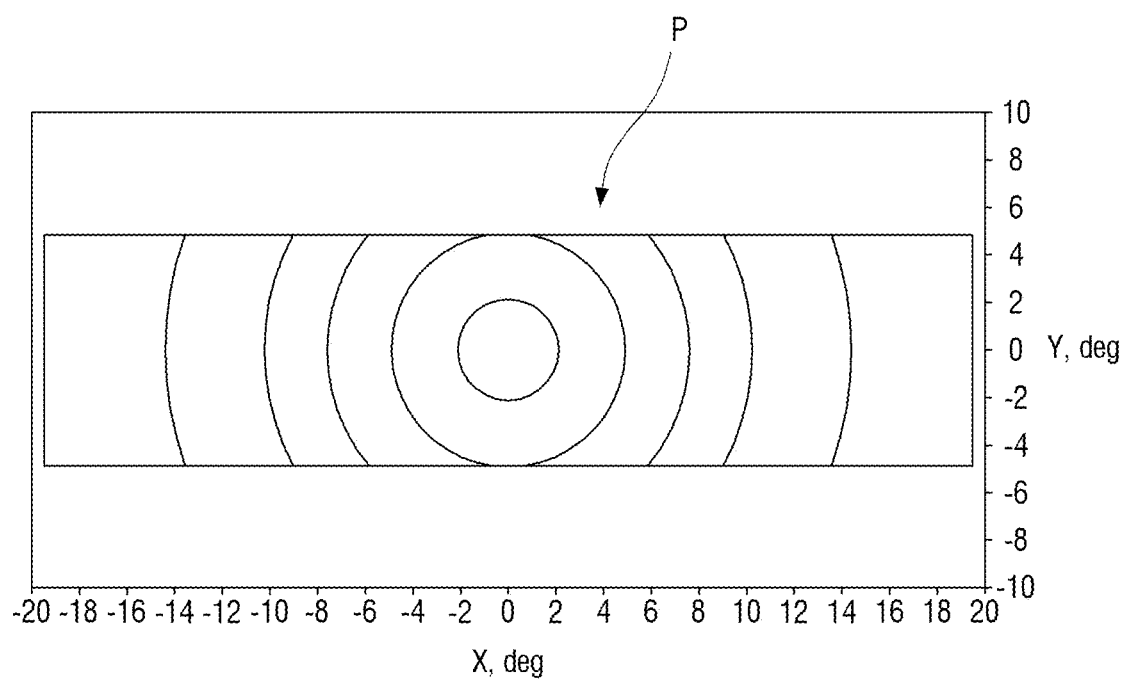
FIG. 3 shows a beam pattern of a lamp for a vehicle according to an exemplary embodiment of the present disclosure.
Figure 4:
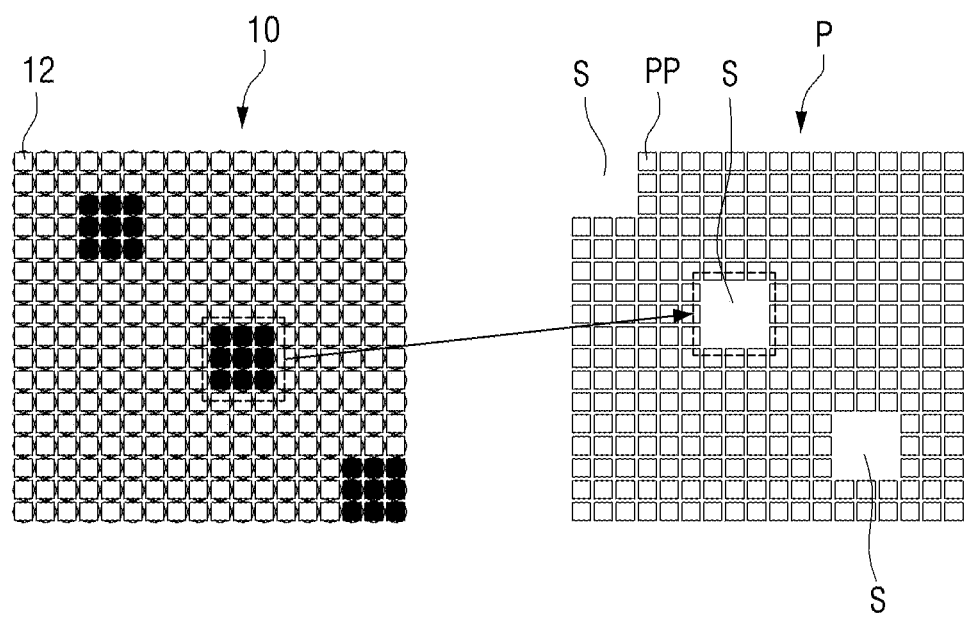
FIG. 4 shows a part of a light source unit of a lamp for a vehicle according to an exemplary embodiment of the present disclosure.

FIG. 1 shows a lamp for a vehicle according to an exemplary embodiment of the present disclosure, FIG. 2 is a cross-sectional view of a lamp for a vehicle according to an exemplary embodiment of the present disclosure, FIG. 3 shows a beam pattern of a lamp for a vehicle according to an exemplary embodiment of the present disclosure, and FIG. 4 shows a part of a light source unit of a lamp for a vehicle according to an exemplary embodiment of the present disclosure.

As shown in FIGS. 1 and 2, a lamp for a vehicle according to an exemplary embodiment of the present disclosure may include a light source unit 10 and an optical unit 100. The light source unit 10 may include a plurality of light sources arranged in a matrix (e.g., array) shape. The optical unit may include a plurality of optical members disposed in a direction of a light traveling path. The light source 12 may be formed to generate light having a light amount and/or color for the lamp for the vehicle of an exemplary embodiment of the present disclosure. The optical member may include at least one of a lens, a mirror, or a prism. Accordingly, the light generated from the plurality of light sources may pass through the optical unit to form a beam pattern P as shown in FIG. 3.

The lamp for the vehicle according to an exemplary embodiment of the present disclosure may form at least one of a low beam pattern, a high beam pattern, or a communication beam pattern in the beam pattern as shown in FIG. 3, in which at least one of the plurality of light sources may be turned off or controlled (e.g., adjusted) to form a shadow zone in the beam pattern. For example, at least part of the plurality of light sources may be controlled or turned off by a controller (not shown) provided in the vehicle to form a low beam pattern. To prevent causing glare to a driver of the detected leading or oncoming vehicle, the controller may adjust at least one light source to form the shadow zone in a partial area of the beam pattern corresponding to a position of the detected driver.

The beam pattern P of an exemplary embodiment of the present disclosure may be formed corresponding to an image in which a light emitting image of the light source unit 10 is inverted vertically (e.g., in an up-down direction) and horizontally (e.g., in a left-right direction). For example, when a light emitting surface of the light source unit 10 is formed as an image in which a part of the plurality of light sources 12 is turned off as shown in FIG. 4A, the beam pattern P may be formed to correspond to the light emitting image of the light source unit 10 including the shadow zone S and inverted vertically and horizontally as shown in FIG. 4B. Further, when the beam pattern P is formed based on the up-down and left-right inversion of the light emitting image of the light source unit 10, the number of the optical members included in the optical unit 100 may be reduced, and thus, the overall size of the lamp for the vehicle may be reduced. Black portions in FIG. 4 correspond to areas where the light source is turned off.

Hereinafter, the light source unit 10 and the optical unit 100 of an exemplary embodiment of the present disclosure will be described in detail. First, the light source will be described.

The light source unit 10 may include a plurality (e.g., about 1,000 or more) of light sources to form a high resolution beam pattern, and a characteristic dimension (e.g., length, width, diameter, or the like) of each light source 12 may be about 100 μm or less. As the light generated by each of the plurality of light sources 12 passes through the optical unit 100, a pixelated pixel beam pattern PP included in the beam pattern P may be formed, in which a size of the pixel beam pattern PP may be related to the size of the light source 12. The smaller the size of the pixel beam pattern is, the higher the resolution may be. Therefore, when the size of the light source is made small as in an exemplary embodiment of the present disclosure, a resolution of the pixel beam pattern PP may be increased. Furthermore, the size of the light source according to an exemplary embodiment of the present disclosure may be less than about 60 μm. The light source 12 may be a light emitting diode (LED), a micro-LED, or the like. However, the type of the light source 12 is not limited thereto.

When the number of light sources is about 1,000 or more, the size of the pixel beam pattern generated by each light source may be 0.25 degrees or less, and an ADB, a cut-off area of the low beam pattern, a communication lamp, or the like may be more efficiently formed and controlled. Furthermore, the number of light sources according to an exemplary embodiment of the present disclosure may be about 10,000 or more.

A width of the light source unit 10 according to an exemplary embodiment of the present disclosure may be greater than a length of the light source unit. In other words, the light source unit 10 may be formed to allow a ratio of the width to the length (e.g., aspect ratio) greater than about 1. Since the beam pattern P in an automotive optical system is generally formed at 40 degrees for right and left and 10 degrees for up and down, the ratio of the width and the length of the light source unit 10 may be about 4:1.

Figure 5A:
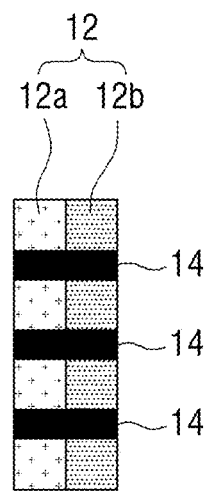
FIGS. 5A and 5B show a light source of the light source unit according to an exemplary embodiment of the present disclosure.
Figure 5B:
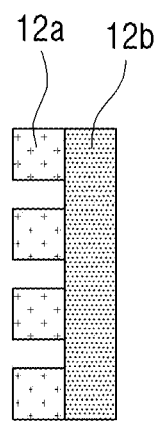
Figure 6:
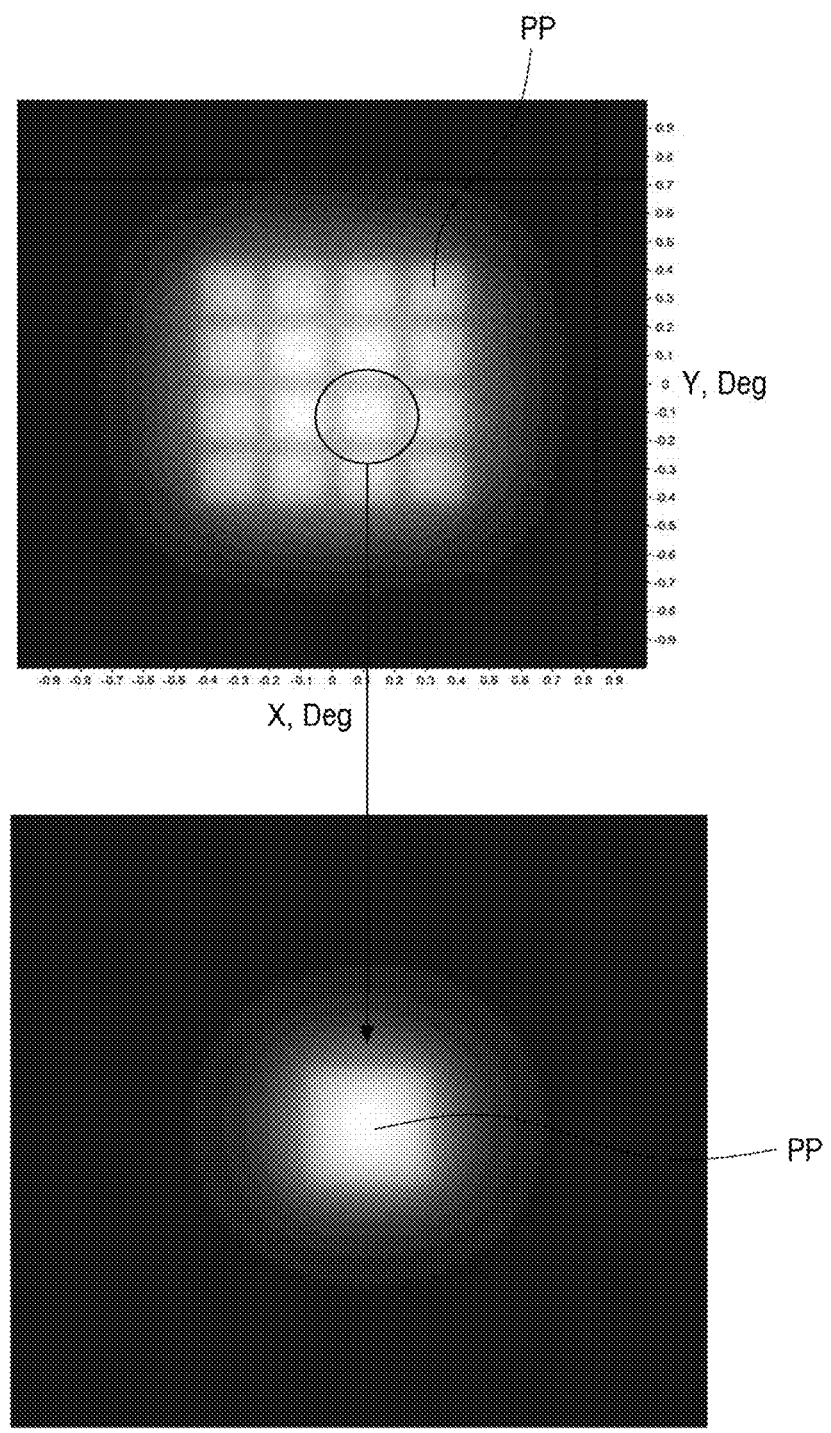
FIG. 6 shows a pixel beam pattern formed by a partition according to an exemplary embodiment of the present disclosure.

FIGS. 5A and 5B show a light source of the light source unit according to an exemplary embodiment of the present disclosure. FIG. 6 shows a pixel beam pattern formed by each light source according to an exemplary embodiment of the present disclosure. As shown in FIG. 5A, the light source unit 10 may further include a partition 14 disposed between the plurality of light sources 12 and separating the plurality of light sources from each other, and each of the plurality of light sources 12 may include an LED chip 12a for adjusting a light amount and a phosphor 12b for emitting light. Conventionally, a lump of phosphor 12b is applied on the plurality of LED chips 12a as shown in FIG. 5B. However, the light source unit 10 according to an exemplary embodiment of the present disclosure may include a plurality of phosphors 12b corresponding to the number of a plurality of LED chips 12a to allow the plurality of light sources 12 to be spaced apart from each other, and the partition 14 may be provided between the plurality of light sources 12.

As each light source is provided with the chip 12a and the phosphor 12b, and the partition 14 is present between the light sources, the generation of the glare in the pixel beam pattern PP may be controlled as shown in FIG. 6, and a size of the phosphor 12b excited by the partition 14 may be defined and limited. Further, since a shape of the glare may be controlled, the beam pattern P including the shadow zone and the cut-off area of the low beam pattern may be created to form a high resolution beam pattern.

Figure 7:
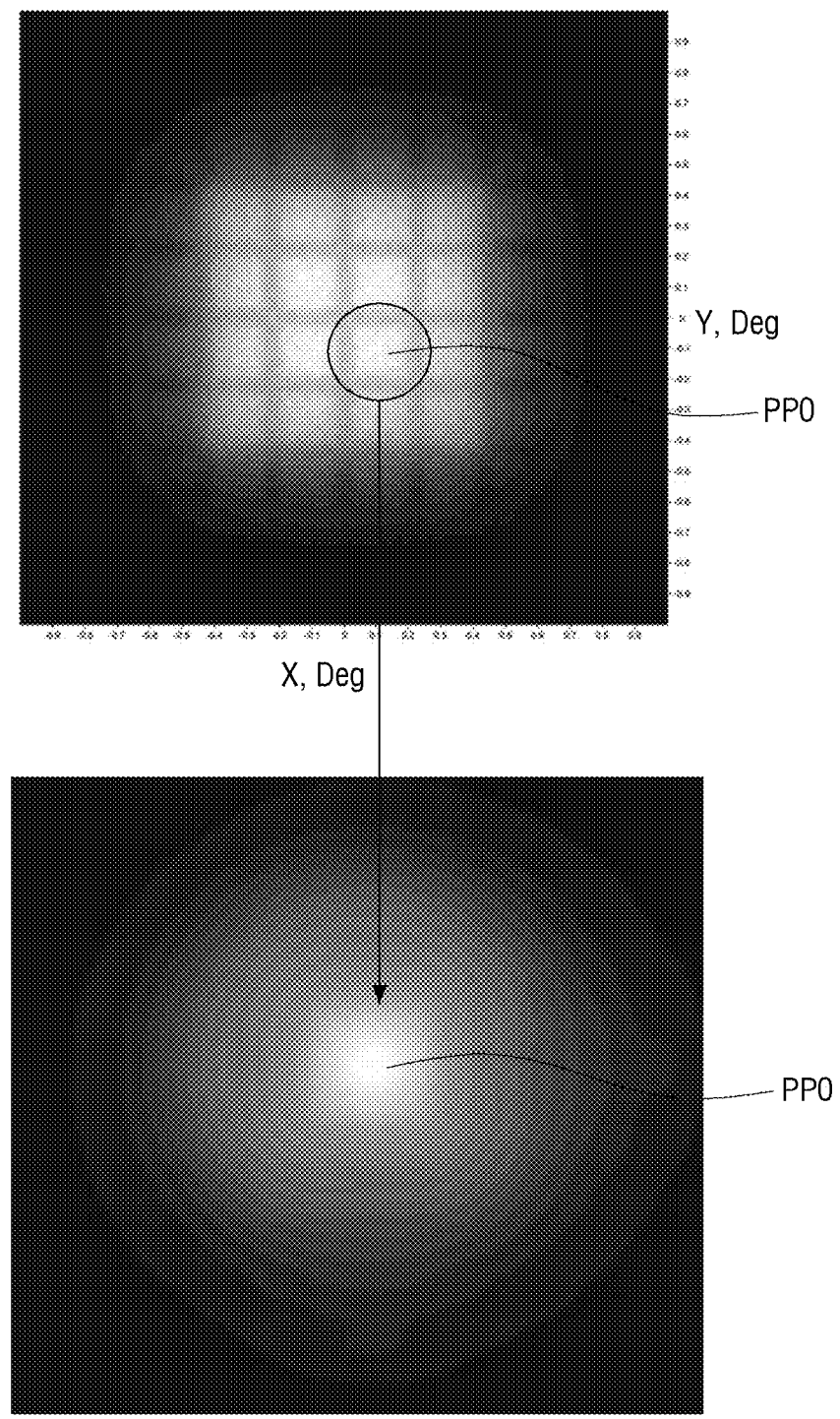
FIG. 7 shows a pixel beam pattern formed when there is no partition according to an exemplary embodiment of the present disclosure.

As shown in FIG. 7, when there is no partition 14 between the plurality of light sources 12, the glare may be generated in the pixel beam pattern PP0 formed by the light source, and thus, the beam pattern may be less sharp (e.g., blurred) and interference may occur. As a result, the beam patterns such as the shadow zone or the cut-off areas of the low beam pattern may be less efficiently formed.

The size of the pixel beam pattern PP according to an exemplary embodiment of the present disclosure may become greater as it goes away from a center of the beam pattern. Specifically, the pixel beam pattern disposed in an area within about 5 degrees of the beam pattern may be substantially similar in size, and a size of the pixel beam pattern included in an area outside of the 5 degrees of the beam pattern may be greater than the size of the pixel beam pattern disposed within about 5 degrees.

For example, FIG. 8 shows first to third pixel beam patterns of an exemplary embodiment of the present disclosure. The size of the pixel beam pattern may be increased toward an outer edge of the beam pattern according to an exemplary embodiment of the present disclosure. For example, as shown in FIG. 8, a size of the first pixel beam pattern PP1 formed at the center of the beam pattern may be about 0.1 degrees, and sizes of the second pixel beam pattern PP2 and the third pixel beam pattern PP3 formed at the outer edge the beam pattern may be about 0.11 degrees and 0.12 degrees, respectively, and the pixel beam pattern may increase in size toward the outer edge of the beam pattern. As the size of the pixel beam pattern decreases, the brightness and the resolution increase. Conversely, as the size of the pixel beam pattern increases, the brightness and the resolution decrease relatively. In addition, the center of the beam pattern requires a higher resolution than the outer edge. Therefore, hot zone performance may be improved by reducing the size of the pixel beam pattern in the center of the beam pattern, and spread performance may be improved by increasing the size of the pixel beam pattern in the outer edge of the beam pattern.

Figure 9A:
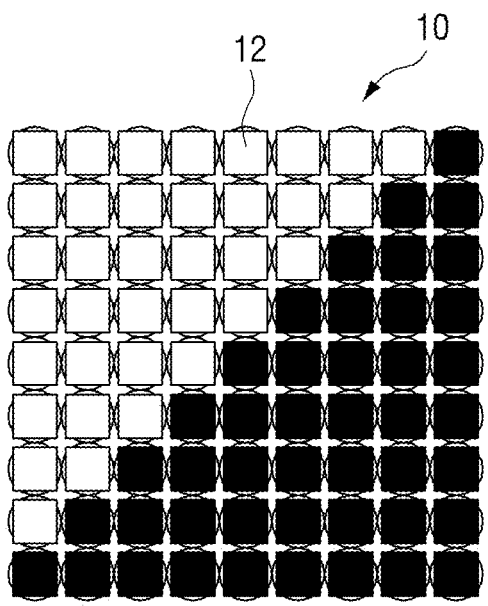
FIGS. 9A and 9B show a light source unit with a part of a light source turned off according to an exemplary embodiment of the present disclosure.
Figure 9B:
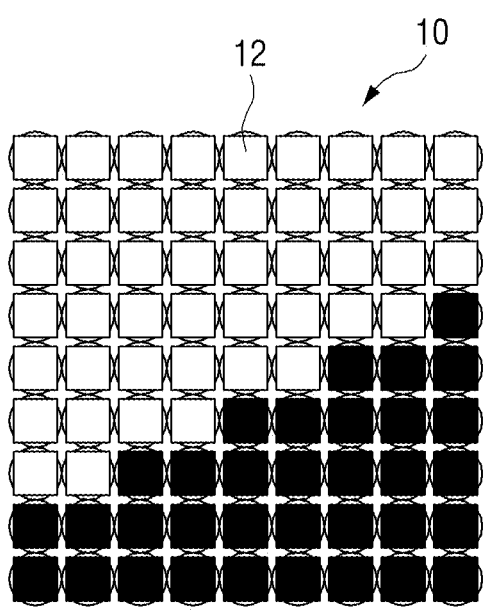
Figure 10:
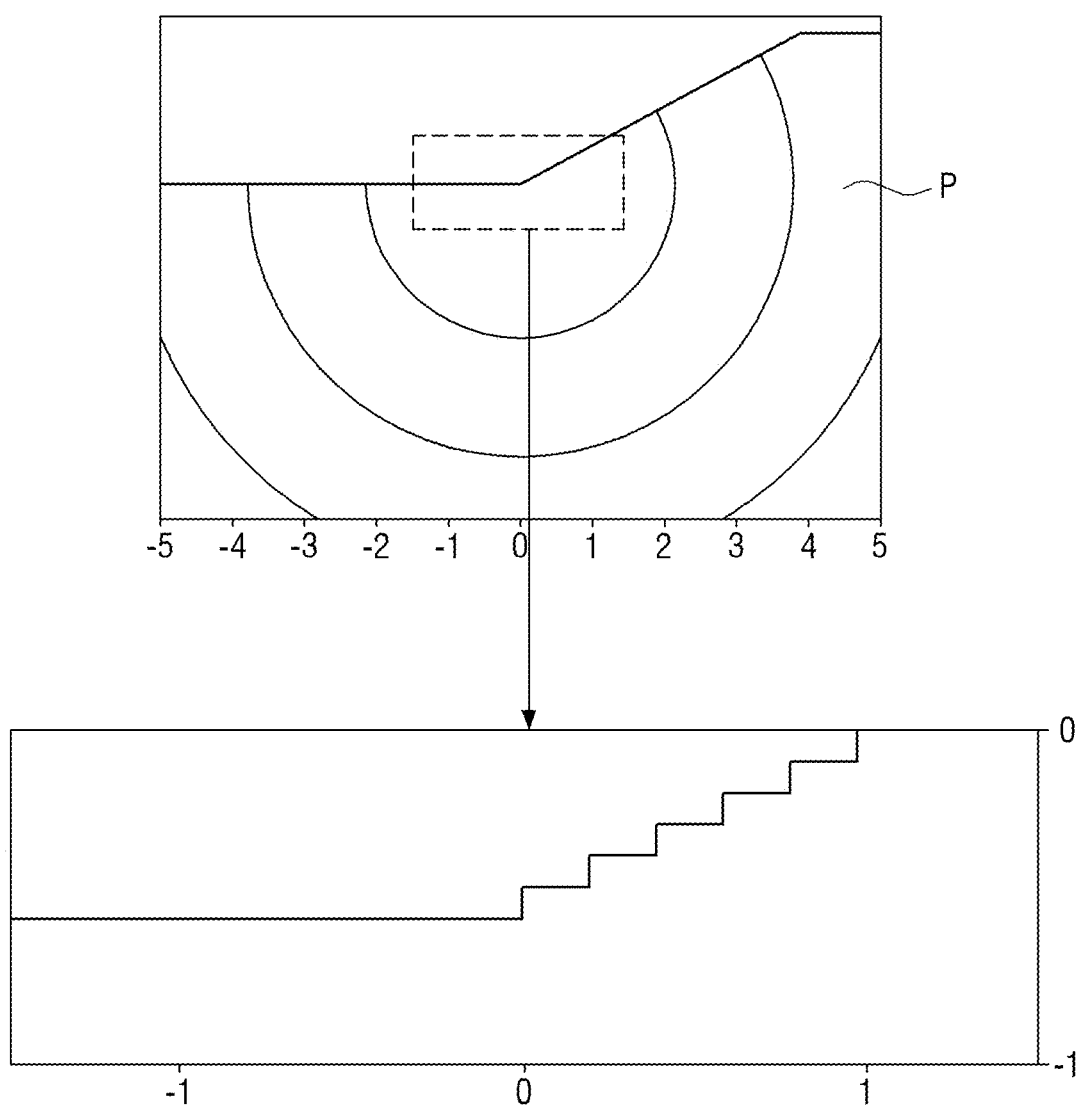
FIG. 10 shows a cut-off area formed by a light source unit.

As described above, the plurality of light sources that form the cut-off area may be partially turned off by the light source that includes the plurality of LED chips to form the cut-off area of the beam pattern. In this case, as shown in FIG. 9A, a number of the light sources that are turned off may be increased by one, going from the top row toward the bottom row, in an area of the light source unit corresponding to the cut-off area. However, in this case, the cut-off area may be formed with an inclination angle of 45 degrees, and thus, it may not satisfy legal requirements for the cut-off area. Accordingly, as shown in FIG. 9B, the cut-off area of the beam pattern may be formed by increasing the number of light sources to be turned off by two to form an angle of the turned off area of the light source unit at about 26 degrees. In FIGS. 9A and 9B, black portions represent the turned off areas in the light source unit. The cut-off area of the beam pattern may be formed as shown in FIG. 10 by the light source unit shown in FIG. 9B.

Figure 11:
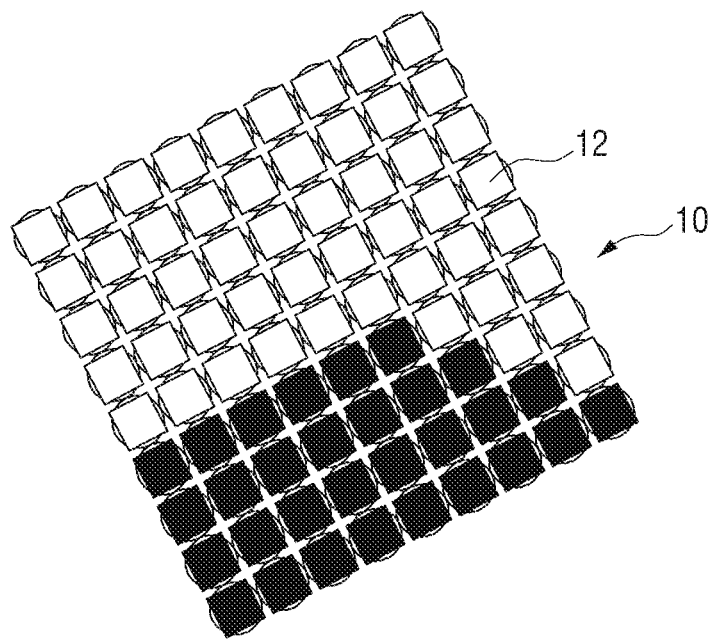
FIG. 11 shows rotation of a light source unit with respect to a central axis according to an exemplary embodiment of the present disclosure.
Figure 12:
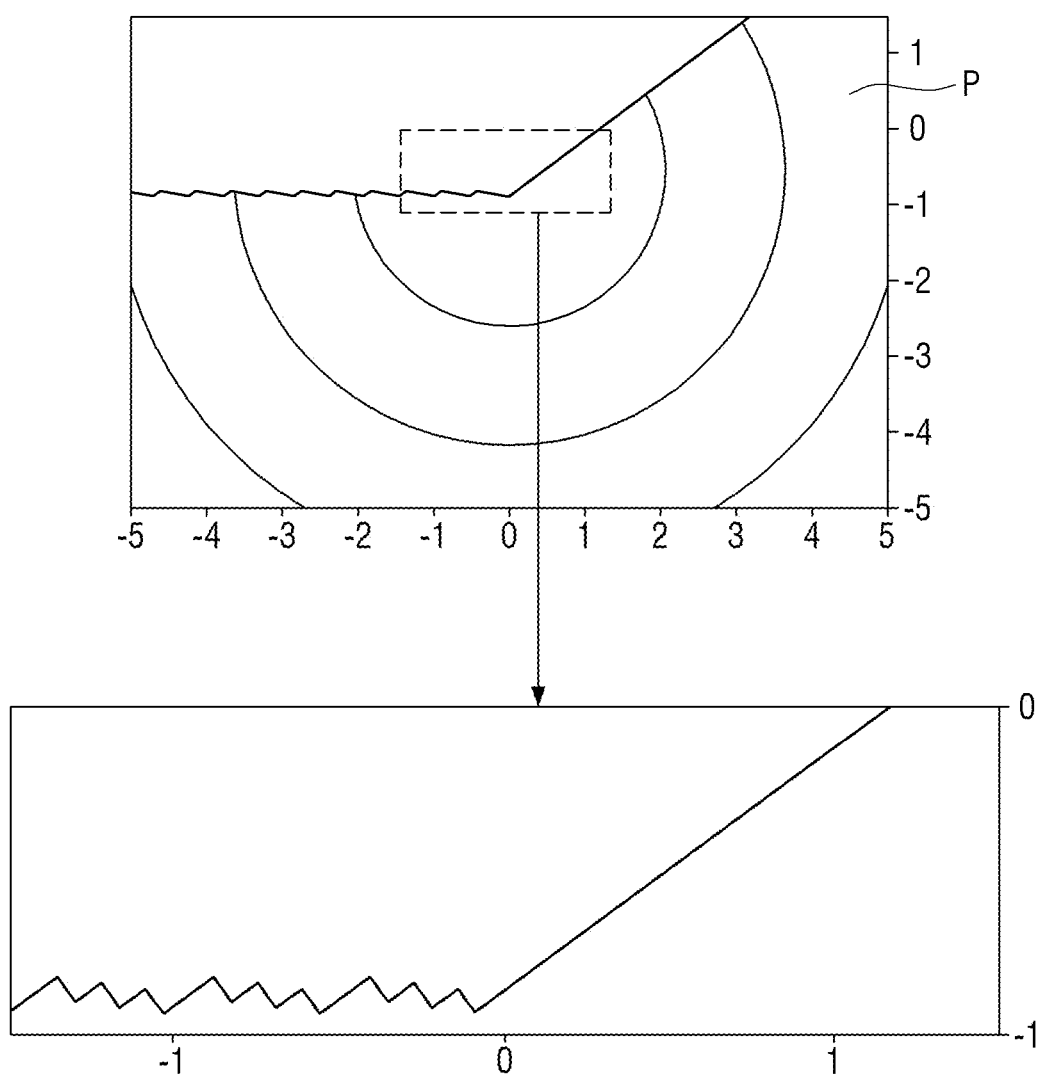
FIG. 12 shows a cut-off area formed by a rotated light source unit according to an exemplary embodiment of the present disclosure.

Alternatively, even when the number of the light sources that are turned off are increased by one as shown in FIG. 9A, the cut-off area that conforms the law may be formed by rotating the light source unit 10 with respect to a central axis Ax of the light source unit 10, and by inclining a part or the whole of the light source unit as shown in FIG. 11. For example, a rotated and inclined angle may be between about 0 degrees and about 37 degrees based on a design of the lamp for the vehicle. The cut-off area of the beam pattern formed by the light source unit rotated about the central axis as shown in FIG. 11 may be formed as shown in FIG. 12.

Figure 13:
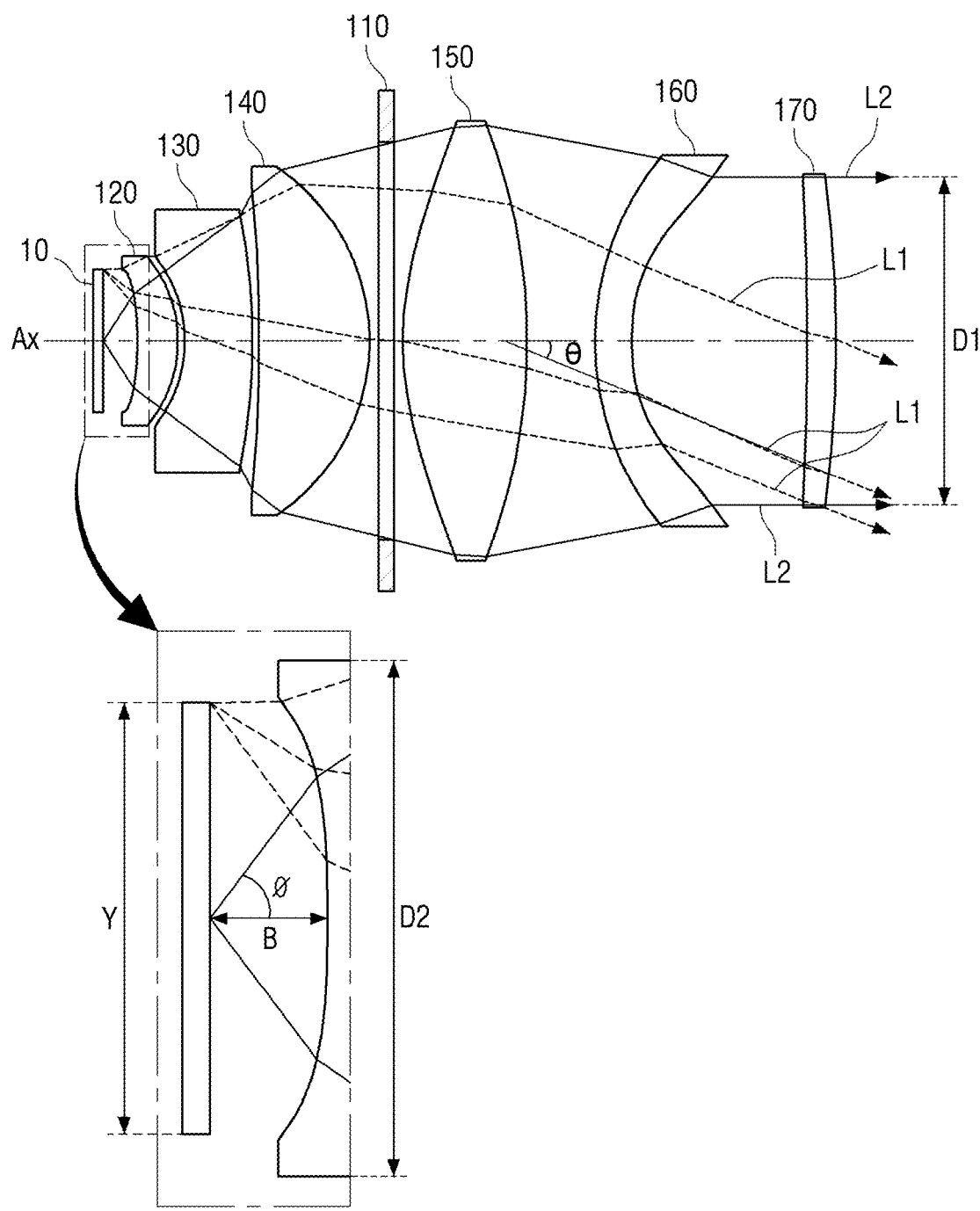
FIG. 13 shows light paths generated in a light source unit of a lamp for a vehicle according to an exemplary embodiment of the present disclosure.
Figure 15:
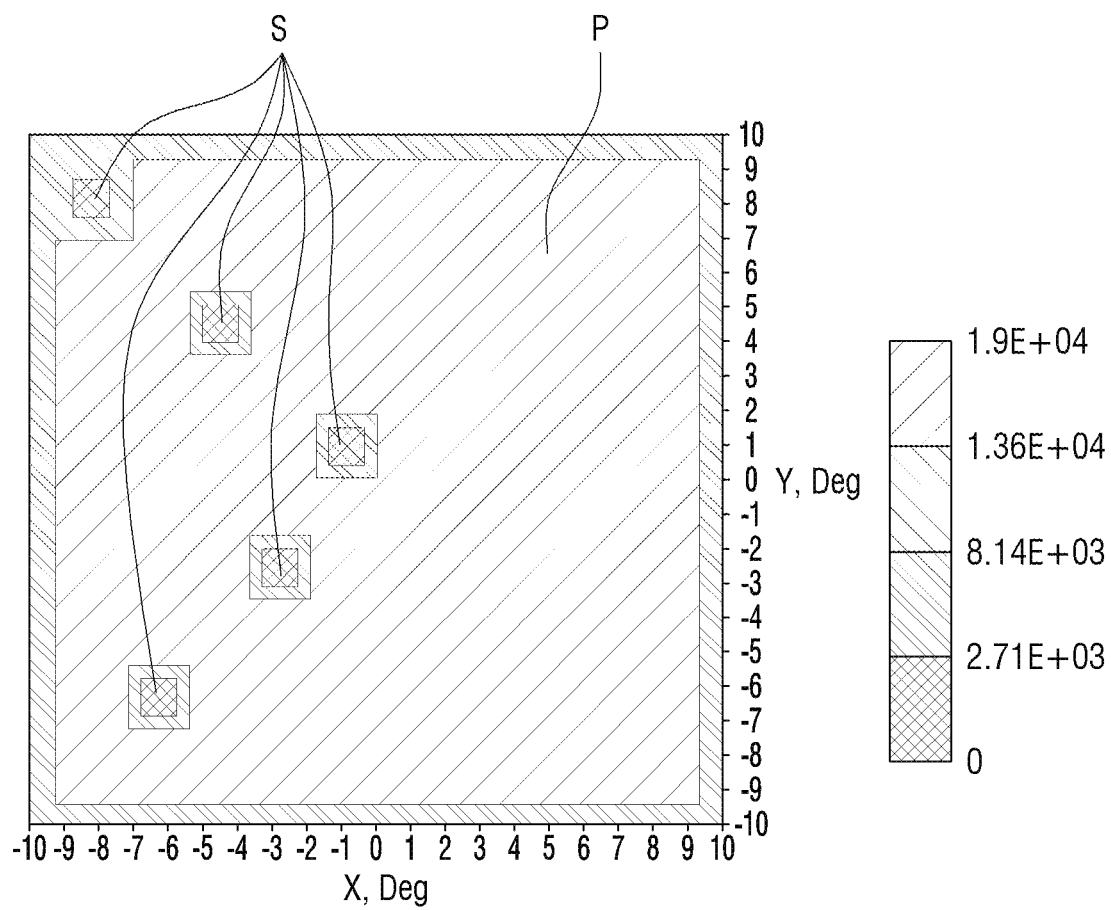
FIG. 15 shows a beam pattern formed by the first exemplary optical system.

Hereinafter, the optical unit 100 will be described. FIG. 13 shows light paths generated in a light source unit of a lamp for a vehicle according to an exemplary embodiment of the present disclosure. Referring FIGS. 1 and 2 again, the optical unit 100 may include the plurality of optical members and the shield member 110 that shields a part of the light generated from the light source unit as described above. Accordingly, as shown in FIG. 15, the light generated from the light source unit 10 may pass through the plurality of optical members and the shield member 110 to form the beam pattern P. Accordingly, the shield member 110 may include an opening through which some light may pass.

Hereinafter, light generated from a light source disposed at the outer edge of the light source unit 10 among the plurality of light sources, i.e., a light source farthest from the central axis Ax of the light source is referred to as first light L1, and light generated from a light source 12 disposed on the central axis Ax1 of the light source unit 10 among the plurality of light sources 12 is referred to as second light L2. Therefore, the beam pattern P may be formed by the first light L1, the second light L2, or the like.

The plurality of optical members may be formed differently as shown in the drawings and may be arranged in a light traveling direction. In addition, the plurality of optical members may include a first optical member 120, a second optical member 130, a third optical member 140, a fourth optical member 150, a fifth optical member 160, and a sixth optical member 170 in the order along a traveling direction of the light generated from the light source unit 10. For example, the number of the optical members may be six, but the number may be changed according to the design of the lamp for the vehicle. Further, sizes of the first to sixth optical members 120, 130, 140, 150, 160, and 170 may be different from each other, and they are not limited to sizes and shapes shown in the drawings.

For example, the first optical member 120, the third optical member 140, the fourth optical member 150, and the sixth optical member 170 may be formed as a converging optical member, and the second optical member 130 and the fifth optical member 160 may be formed as a diverging optical member. When parallel light is incident on an incident surface of the optical member and is emitted toward a point (e.g., focal point) from an emitting surface of the optical member, the optical member may be referred to as the converging optical member. When parallel light is incident on the incident surface of the optical member and diverges from the emitting surface of the optical member, the optical member may be referred to as the diverging optical member.

In order to improve the driver's visibility as in the beam pattern P of an exemplary embodiment the present disclosure, the central region of the beam pattern P may be required to be brighter than an outer side region in accordance with the automobile regulations and performance requirements. Legislative requirements to prevent glare for oncoming vehicles and/or pedestrians primarily concerns the central region. Therefore, it is important to form a beam pattern that may improve the resolution performance and maintain the brightness of the central region of the beam pattern by shielding a portion of the light in the outer edge region without shielding the light directed toward the center of the beam pattern.

The lamp for the vehicle according to an exemplary embodiment of the present disclosure may gradually shield light toward the outer edge from the center of the light source unit using the first optical member and the sixth optical member (or last optical member). In other words, a degree of shielding of the light irradiated from the light source unit may be adjusted by diameters of the first optical member and the sixth optical member (last optical member). For example, when a diameter of the optical member is reduced, the degree of shielding may be increased from the outer edge, and when the diameter of the optical member is increased, the degree of shielding may be decreased from the outer edge. Since the influence on the degree of shielding is maximal in the first optical member and the sixth optical member (last optical member), the degree of shielding may be adjusted by adjusting the diameters of the first optical member and the sixth optical member (last optical member).

Figure 14:
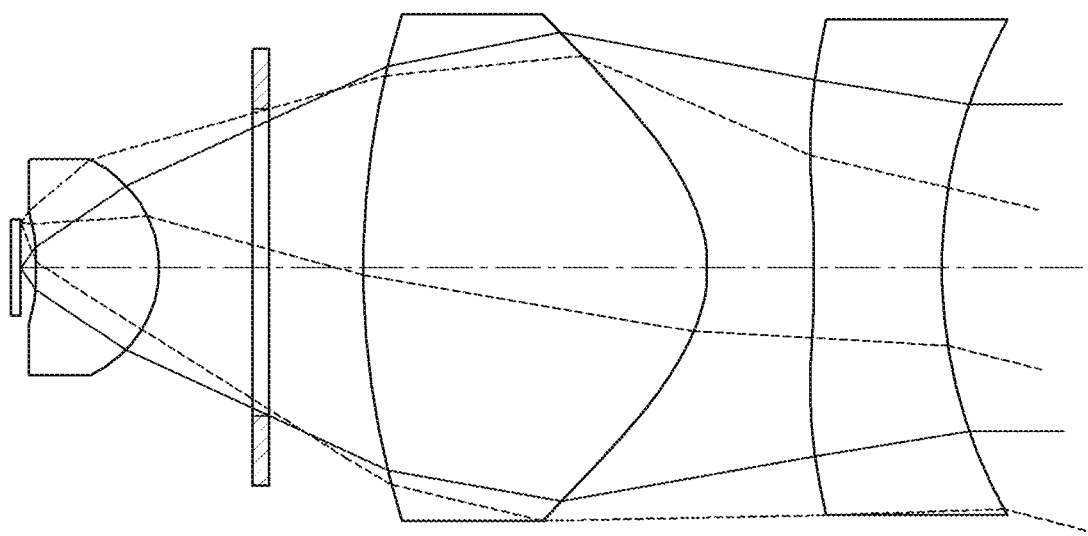
FIG. 14 shows a first exemplary optical system before shielding.
Figure 16:
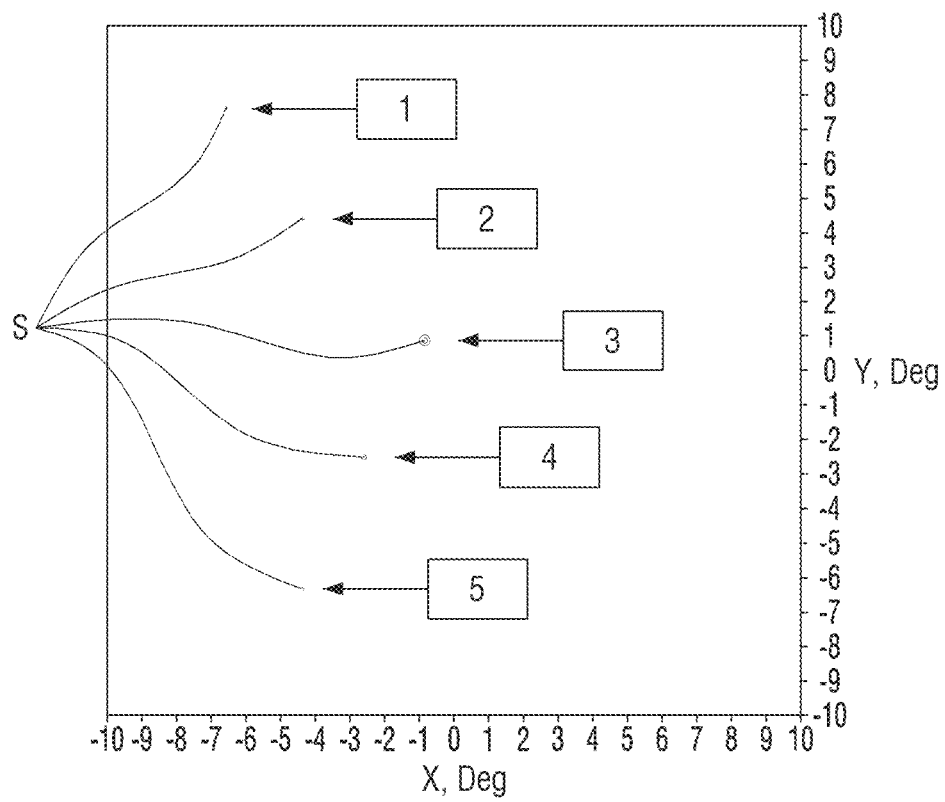
FIG. 16 shows a shadow zone formed by the first exemplary optical system.

For example, a beam pattern formed depending on whether light is shielded or not will be described with reference to FIGS. 14 and 17 as follows. FIG. 14 shows a first exemplary optical system in which a diameter of the first optical member into which light is incident is 13 mm or more, and a diameter of the last optical member (i.e., third optical member) is 30 mm or more. FIG. 15 shows a beam pattern and a shadow zone formed in the first exemplary optical system, and FIG. 16 shows the shadow zone S that has a luminous intensity below about 300 cd.

Figure 17:
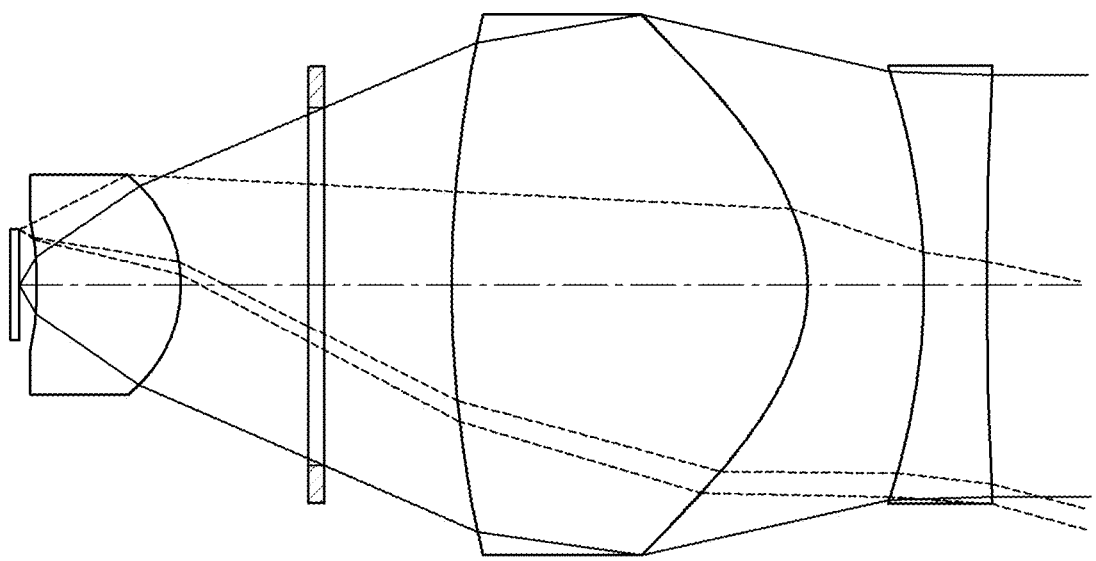
FIG. 17 shows a shielded second exemplary optical system.
Figure 18:
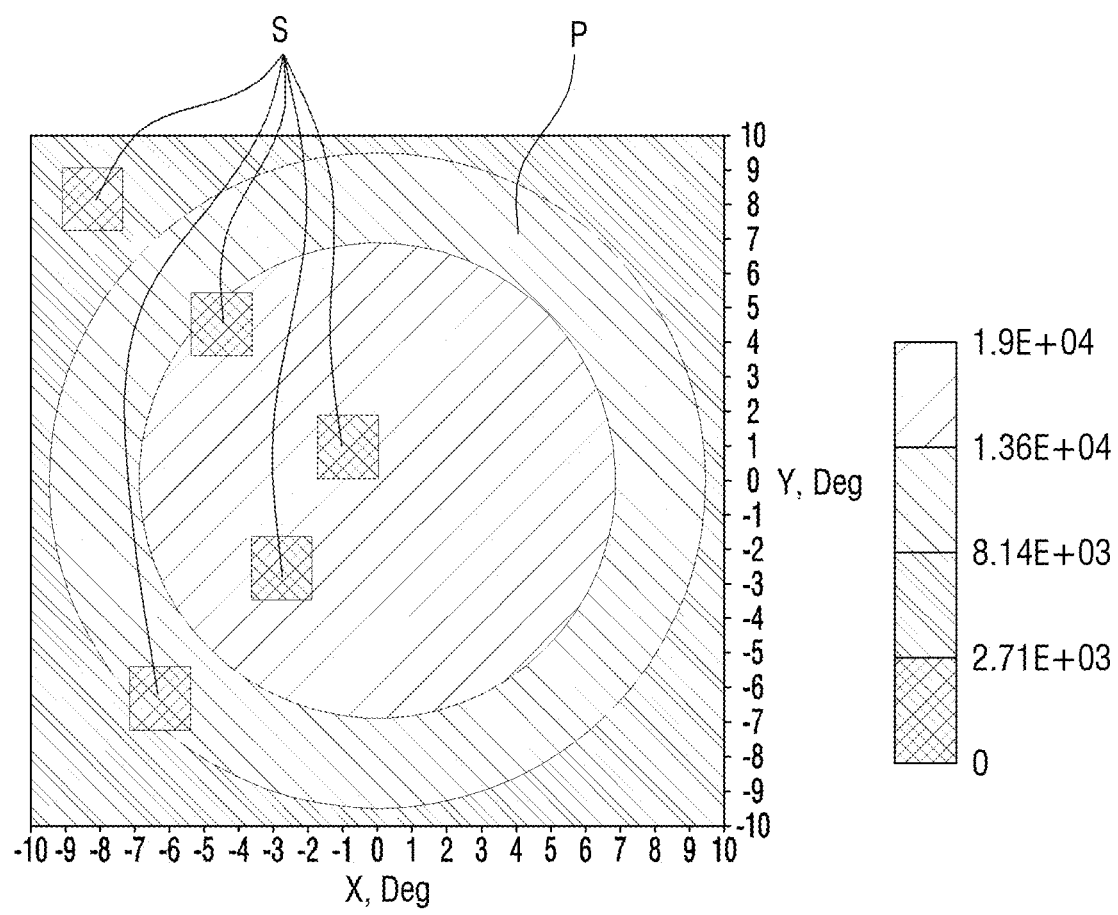
FIG. 18 shows a beam pattern formed by the second exemplary optical system.
Figure 19:
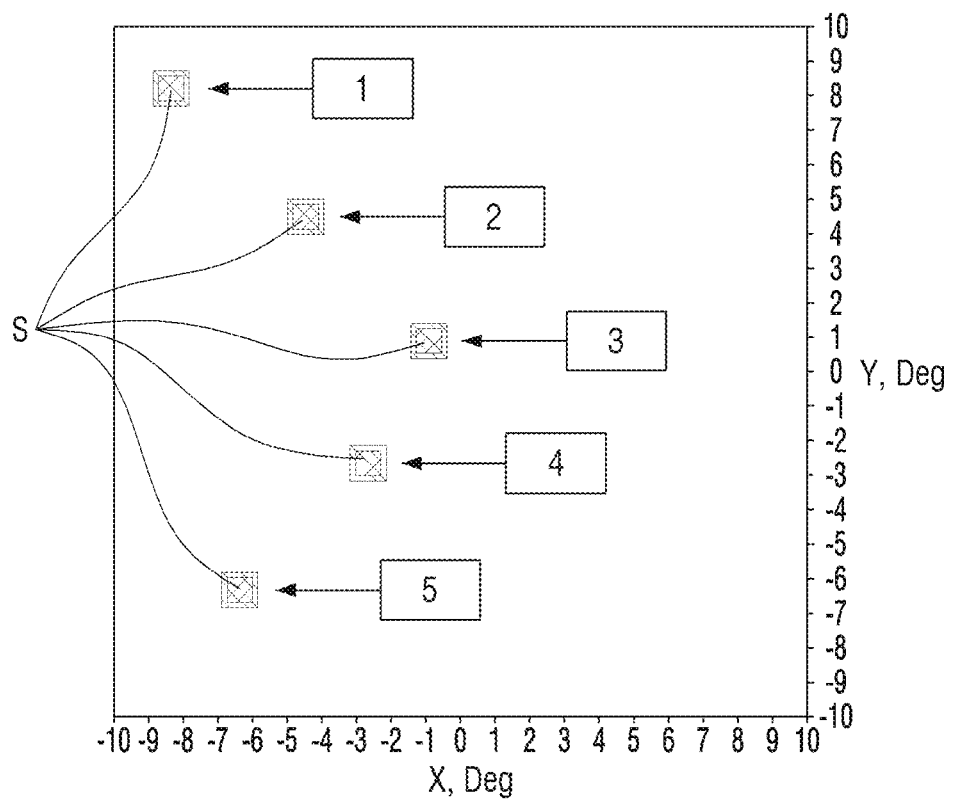
FIG. 19 shows a shadow zone formed by the second exemplary optical system.

FIG. 17 shows a second exemplary optical system in which the diameter of the first optical member into which light is incident is less than 13 mm, and the diameter of the last optical member (i.e., third optical member) is less than 30 mm. FIG. 18 shows a beam pattern and a shadow zone formed in the second exemplary optical system, and FIG. 19 shows the shadow zone S that has a luminous intensity below about 300 cd.

Comparing FIGS. 14 and 17, in the second exemplary optical system in which the first optical member and the last optical member are smaller (FIG. 17), a part of the light generated from the outer edge of the light source unit may be shielded compared with the first exemplary optical system. As a result, the shadow zone S may be formed more sharply in the second exemplary optical system. In other words, when a light receiving angle of the first light is reduced in the light source unit 10, the resolution of the beam pattern and the brightness of the center of the beam pattern may be improved.

Figure 20:
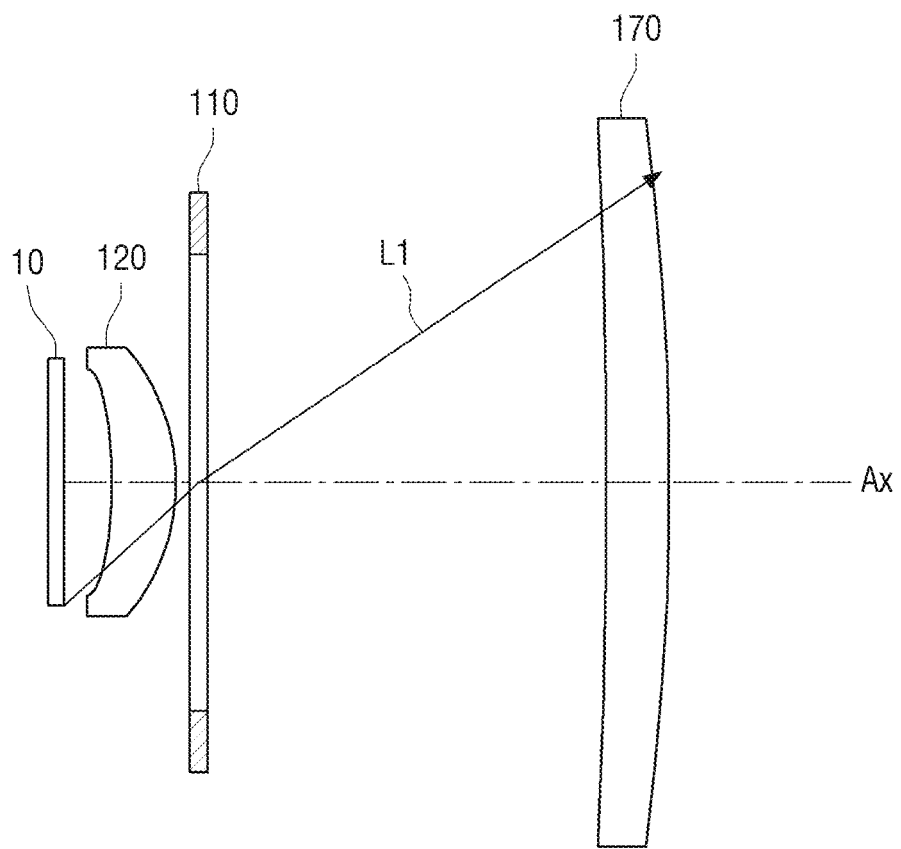
FIGS. 20 to 22 schematically show paths of a first light depending on a position of a shield member according to an exemplary embodiment of the present disclosure.
Figure 21:
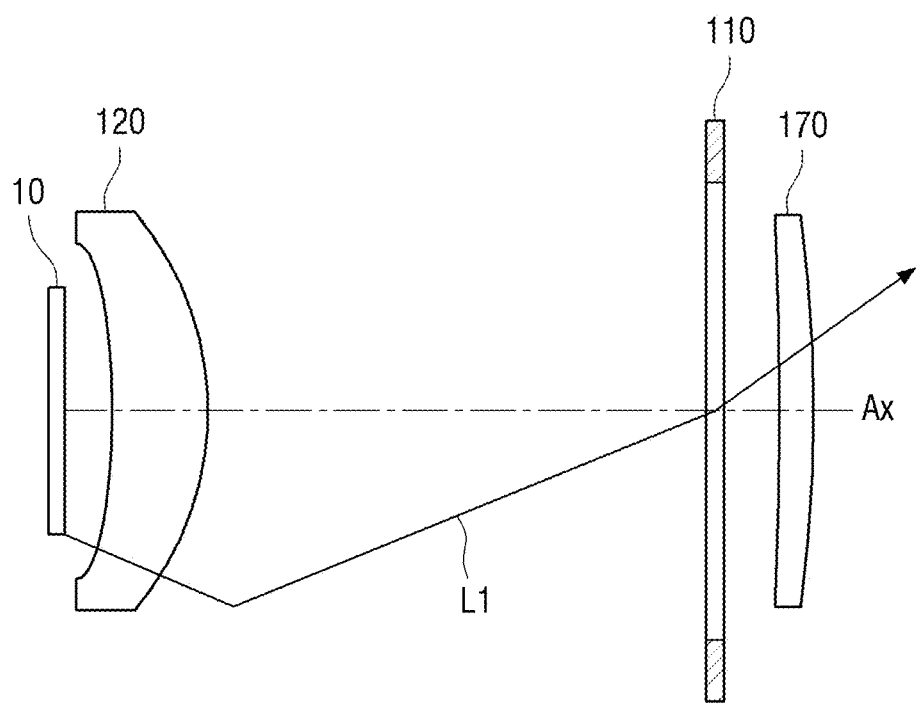
Figure 22:
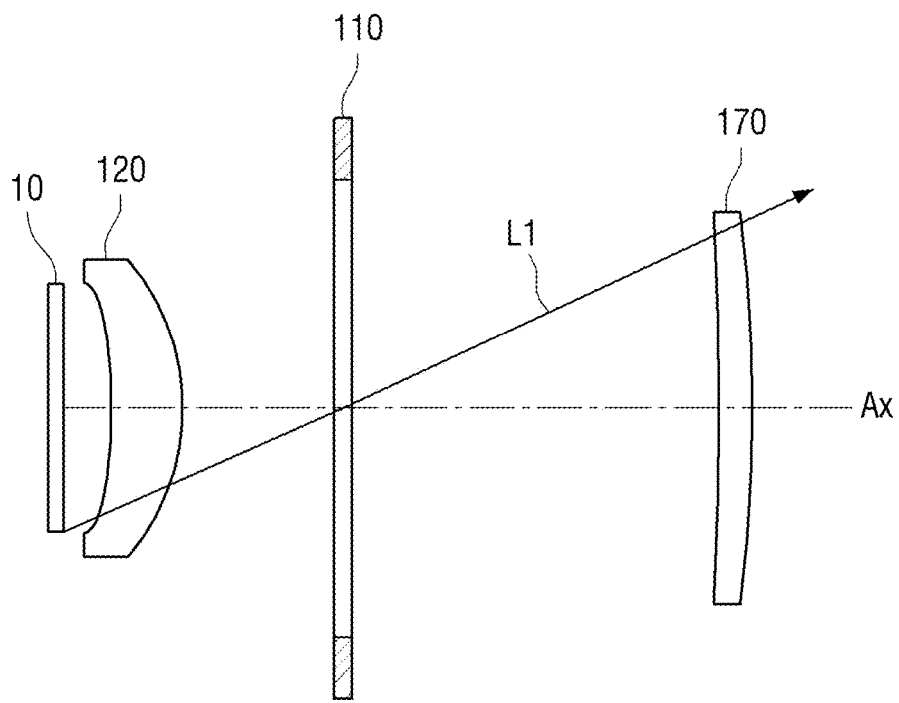

FIGS. 20 to 22 schematically show a path of the first light passing through a central portion of the opening of the shield member 110 depending on a position of the shield member 110 according to an exemplary embodiment of the present disclosure. At least one of the first light may travel through the center portion of the opening of the shield member. When the shield member 110 is provided closer to the light source unit 10 as shown in FIG. 20, a size of the last optical member among the plurality of optical members may be increased along a path of the first light L1, and thus, the resolution and brightness efficiency of the beam pattern P may be reduced. When the shield member 110 is disposed near the last optical member as shown in FIG. 21, the size of the first optical member 120 may be increased, and thus, it may be difficult to control the beam pattern. Therefore, the shield member 110 according to an exemplary embodiment of the present disclosure may be disposed near the middle of the optical unit as shown in FIG. 22. For example, the shield member 110 may be disposed between the third optical member 140 and the fourth optical member 150.

Accordingly, the second light L2 generated at the central axis Ax of the light source unit 10 of an exemplary embodiment of the present disclosure may be diverged by the optical members near the shield member 110 due to the positions of the plurality of optical members and the shield member 110. In order to efficiently form the beam pattern P of an exemplary embodiment of the present disclosure, the second light L2 may be irradiated with parallel light. In order to form the divergent second light L2 as the parallel light, the second light L2 may be refracted to converge, and therefore, the optical member adjacent to the shield member 110 along the light traveling direction may be made to be the largest optical member. In other words, the fourth optical member 150 may be formed to be the largest among the plurality of optical members.

As a result, the second light L2 may be diverged by the shield member 110 to the largest optical member among the plurality of optical members, and may pass through the largest optical member. Subsequently, the second light L2 may converge until the last optical member in the light traveling direction among the plurality of optical members, and may pass through the last optical member to form the parallel light. The second light L2 may be formed as the light having the largest angle with respect to the central axis among the light generated from the light source unit. In other words, a light receiving angle ϕ of the second light L2 may be the largest.

Specifically, the second light L2 may be diverged away from the central axis Ax until it reaches the fourth optical member 150 as the second light L2 passes through the first optical member 120, the second optical member 130, and the third optical member 140, and subsequently, the second light L2 may be converged toward the central axis Ax by the fourth optical member 150 and the fifth optical member 160 and be formed as the parallel light after passing through the sixth optical member 170.

A diameter of the parallel light emitted from the sixth optical member 170 may be determined based on the light receiving angle ϕ of the second light L2 and the diameter of the light source unit 10. Specifically, it may be determined by Equation 1 as follows.

$$D1 = \frac{Y}{\tan\theta}\sin\phi \quad \text{(Equation 1)}$$

Where ϕ is the light receiving angle of the second light L2, θ is an angle formed by the first light L1 emitted from the sixth optical member and the central axis Ax, i.e., an angle of beam pattern, Y is the diameter of the light source unit 10, and D1 is a diameter of the parallel light. The diameter of the parallel light is a diameter of an area through which the parallel lights pass, and the sixth optical member is an optical member disposed at the last among the plurality of optical members with respect to the light traveling direction.

As such, when a size of the LED is determined, the diameter D1 of the parallel light may be determined, and accordingly, there is a limit to which the size of the sixth optical member 170 may be reduced. Therefore, the size of the sixth optical member 170 may be reduced by providing the shield member 110. The shield member may be formed as an aperture.

According to an exemplary embodiment of the present disclosure, referring to FIG. 13 again, a ratio of a first length B, which is a distance from the center of the light source 10 to the first optical member 120 along the central axis Ax, and the diameter D2 of the first optical member 120 may be formed to be between 0 and 1. Specifically, the diameter D2 of the first optical member 120 may be determined based on the first length B. For example, the minimum light receiving angle of light may be 45 degrees. Accordingly, the diameter D2 of the first optical member 120, which may be determined based on the minimum light receiving angle, may be obtained by a trigonometric function.

However, since light may be generated with the minimum light receiving angle also at the outer edge of the light source unit 10, the diameter D2 of the first optical member 120 may be greater than or equal to a value obtained by the trigonometric function. In addition, the incident surface of the first optical member 120 may be formed of any one of a spherical surface, an aspherical surface, and a flat surface.

When the incident surface of the first optical member 120 is a flat surface according to the above conditions, a minimum possible radius (i.e., a half of diameter D2) of the first optical member 120 may be the same as the first length B. Therefore, a ratio E between the first length B and the diameter D2 of the first optical member may be 0.5 from the following equation.

$$B = X, D2 = 2X, E = \frac{X}{2X} = 0.5$$

Where B is the first length, D2 is the minimum possible diameter of the first optical member, and E represents the ratio between the first length B and the diameter D2 of the first optical member.

When the incident surface of the first optical member 120 is the spherical surface, a minimum possible radius (i.e., a half of diameter D2) of the first optical member becomes the minimum when it is half of the first length B. Accordingly, the ratio between the first length B and the diameter D2 of the first optical member may become 1 from the following equation.

$$B = 2X, D2 = 2X, E = \frac{2X}{2X} = 1$$

Where B is the first length, D2 is the diameter of the first optical member that may be formed as the minimum, and E represents the ratio between the first length B and the diameter D2 of the first optical member. In addition, the first length may be 0.

Summarizing the above, the ratio E between the first length B and the diameter D2 of the first optical member 120 may be formed between 0 and 1.

The plurality of light sources of an exemplary embodiment of the present disclosure may generate light, and each of the plurality of light sources may generate center light that passes through the center portion of the opening of the shield member 110 and peripheral light that is spaced apart farthest from the center light and passes near an edge of the opening of the shield member 110. In other words, each of the first light and the second light may include the center light and the peripheral light, respectively.

According to the foregoing, as the light source is disposed away from the center of the light source unit 10, an angle between the center light and the peripheral light may become smaller. Therefore, the resolution of the beam pattern and the brightness of the center of the beam pattern may be efficiently improved. In particular, the angle between the center light and the peripheral light may be an angle between the center light and the peripheral light before entering the optical unit 100. In other words, it is an angle between the center light and the peripheral light formed before entering the first optical member 120. Therefore, the light receiving angle of the first light generated at the outer edge of the light source unit 10 may be smaller than the light receiving angle of the second light generated at the central axis of the light source unit 10.

Figure 23A:
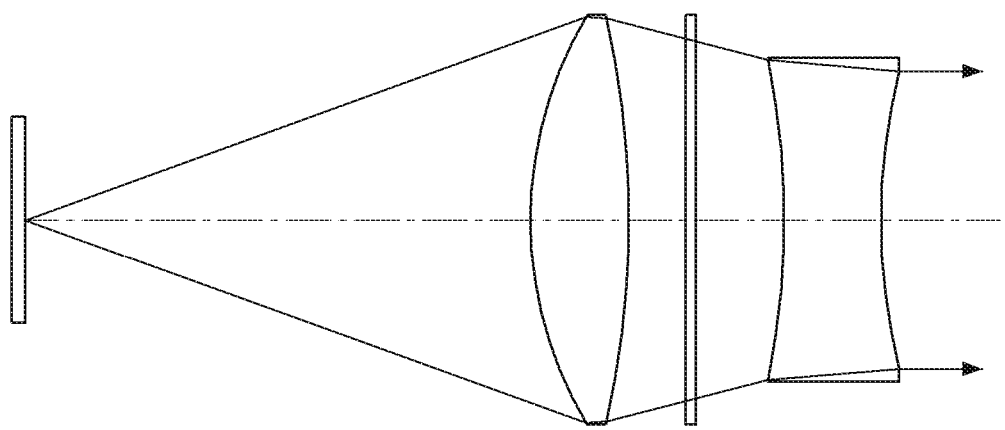
FIGS. 23A-23C show optical members expanding or contracting due to a temperature change.
Figure 23B:
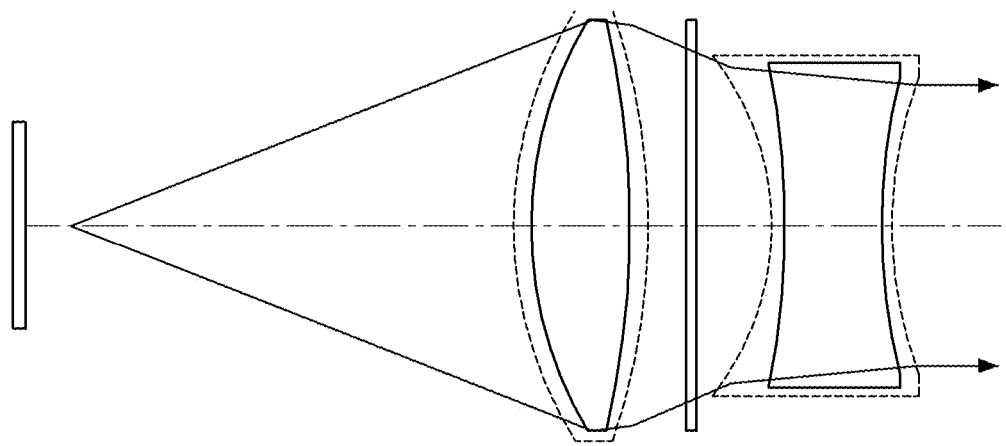
Figure 23C:
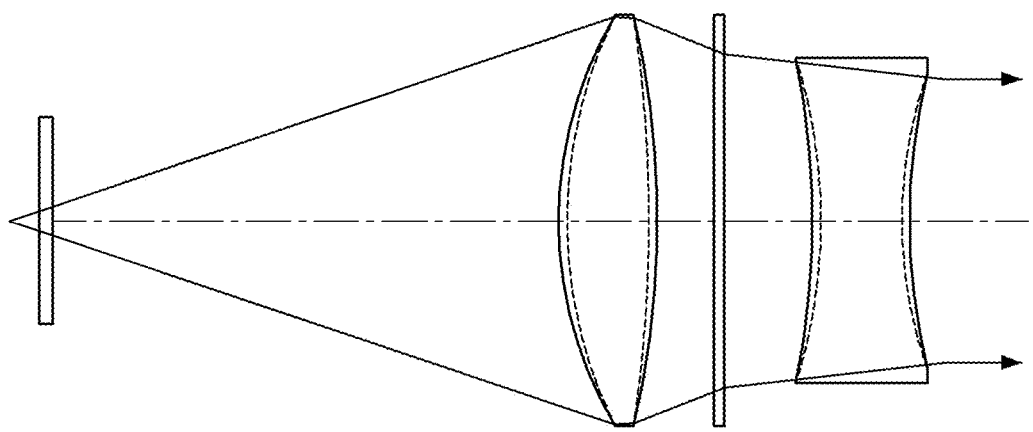
Figure 24A:
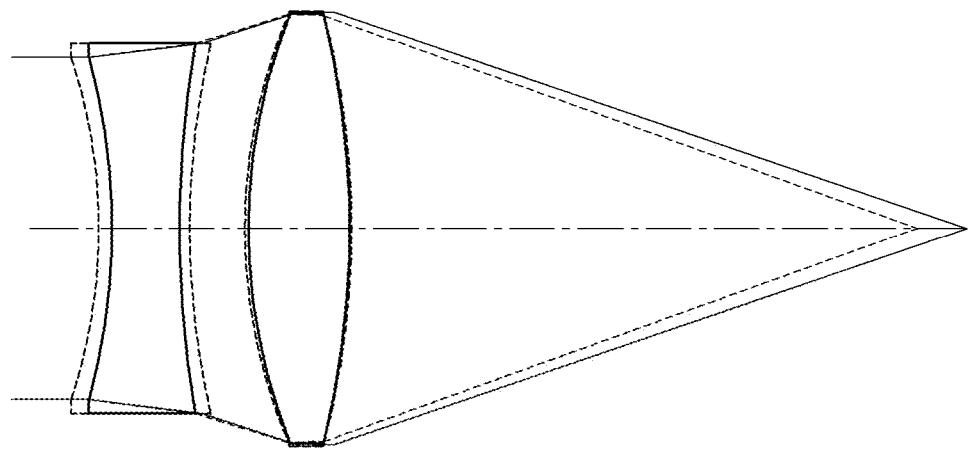
FIGS. 24A and 24B show beam paths formed depending on the number of plastic optical members.
Figure 24B:
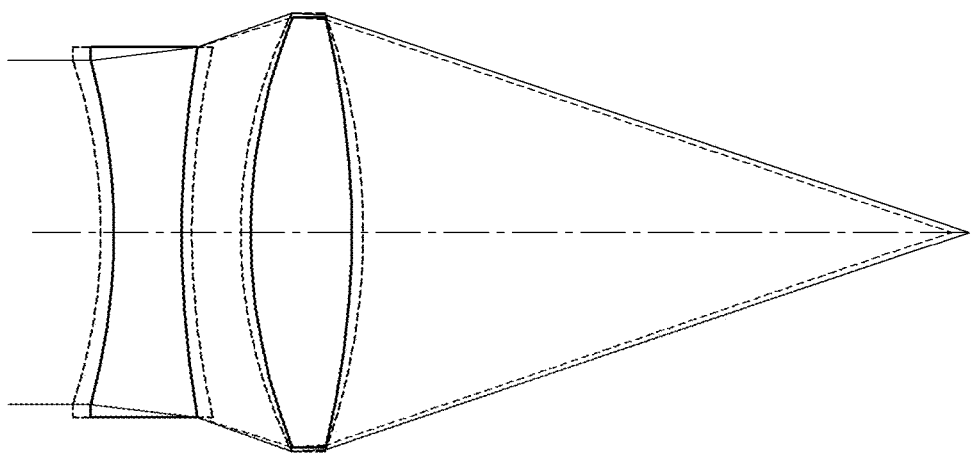
Figure 25A:
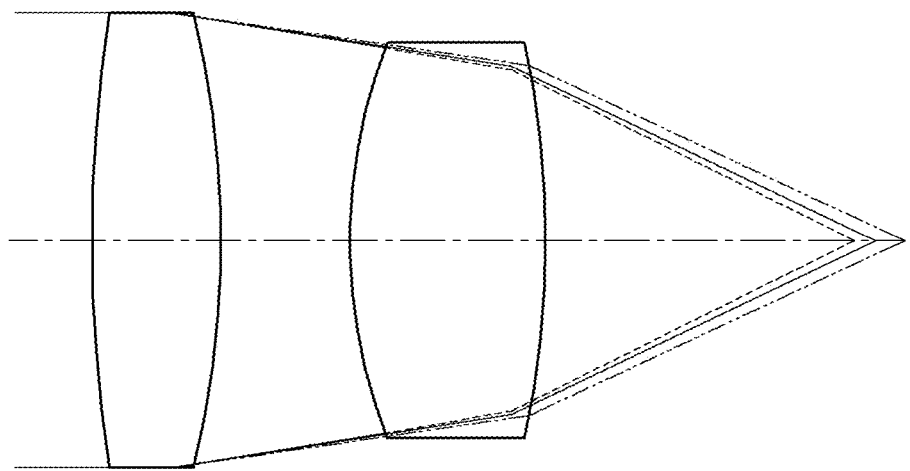
FIGS. 25A and 25B show beam paths formed depending on a converging plastic optical member and a diverging plastic optical member.
Figure 25B:
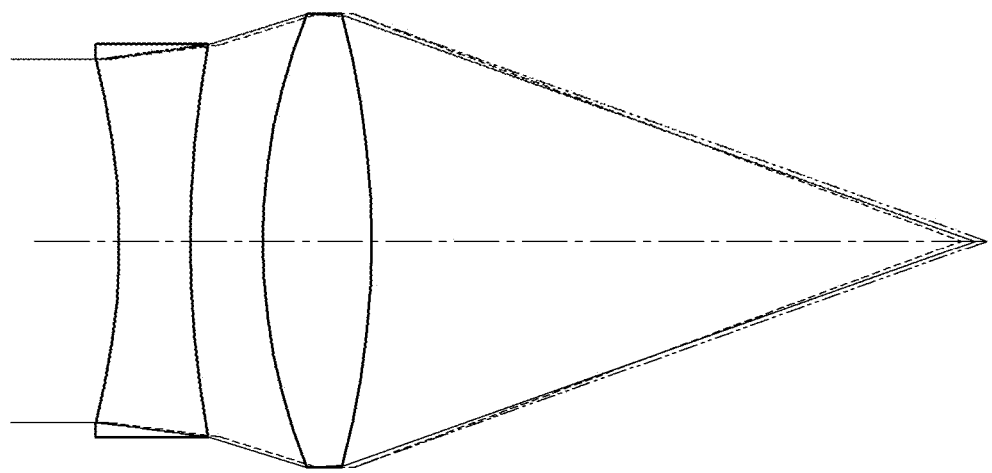

FIGS. 23A-23C show that an optical member may expand or contract due to a temperature change. FIGS. 24A and 24B show beam paths formed depending on the number of optical members. FIGS. 25A and 25B show beam paths formed depending on a converging optical member and a diverging optical member.

The plurality of optical members of the lamp for the vehicle according to an exemplary embodiment of the present disclosure may include a first set of optical members formed of a first material and a second set of optical members formed of a second material. In addition, the second set of optical members formed of the second material may have at least one of thermal expansion or thermal contraction more than the first set of optical members formed of the first material. When the optical member expands and contracts due to a temperature change, a curvature, a thickness, a refractive index, or the like may also change, thereby causing a focus shift.

For example, the first material may be glass, and the second material may be plastic. In this case, the optical member formed of plastic may be more significantly affected by temperature than the optical member formed of glass. Specifically, the plastic optical member may not contract or expand at a normal temperature (e.g., a room temperature) as shown in FIG. 23A, and the focus may not move. When the temperature is increased, the plastic optical member may expand as shown in broken lines in FIG. 23B, and when the temperature is decreased, the plastic optical member may contract as shown in broken lines in FIG. 23C, thereby changing the focus.

Depending on the temperature change, the number of the second set of optical members of the second material which contracts and expands more may be 0 or an even number. As shown in FIG. 24A, when the plastic optical member and the glass optical member are provided in a 1:1 ratio, the plastic optical member may expand more as described above and may be unable to be compensated. On the other hand, as shown in FIG. 24B, when the optical unit is formed of two plastic optical members (i.e., the plastic optical members are provided in an even number), to the focus shift due to the thermal expansion may be compensated with each other, thereby reducing the influence of temperature change.

However, as shown in FIG. 25A, when all of the plastic optical members are converging optical members or diverging optical members, an aberration may be unable to be corrected. Therefore, as shown in FIG. 25B, the aberration may be corrected by making the ratio of the number of diverging optical members and the number of converging optical members equal to 1:1, i.e., forming a half of the even numbers as the converging optical members and the other half as the diverging optical members.

Accordingly, when a part of the plurality of optical members according to an exemplary embodiment of the present disclosure are formed of the plastic, the resolution of the beam pattern may be increased by providing it in even numbers and forming the converging optical members and the diverging optical members at the same ratio. For example, the first optical member 120, the second optical member 130, the third optical member 140, and the fourth optical member 150 may be formed of the glass, and the fifth optical member 160 and the sixth optical member 170 may be formed of the plastic. In this case, as described above, the fifth optical member 160 may be formed of the diverging optical member, and the sixth optical member 170 may be formed of the converging optical member.

According to the foregoing, the lamp for the vehicle according to an exemplary embodiment of the present disclosure may efficiently form a beam pattern having a bright center and a high resolution.

Furthermore, the present disclosure may reduce the glare by controlling the light amount of the light source unit 10, and may effectively form the shadow zone to prevent causing the glare to the driver of the preceding vehicle.

Figure 26A:
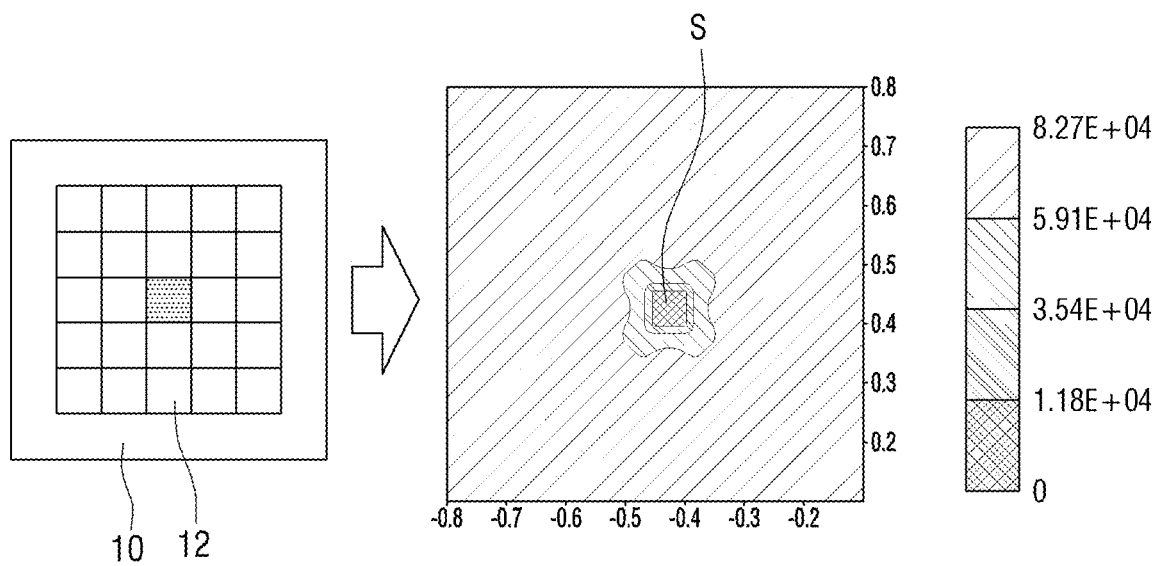
FIGS. 26A-26C show that some light sources of a lamp for a vehicle according to an exemplary embodiment of the present disclosure are controlled.
Figure 26B:
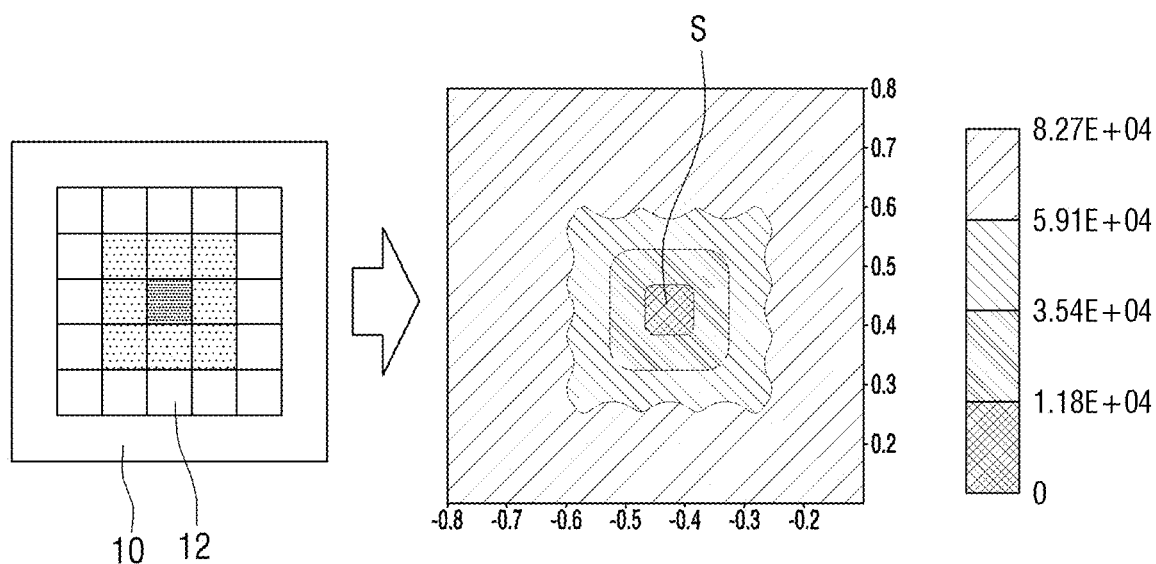
Figure 26C:
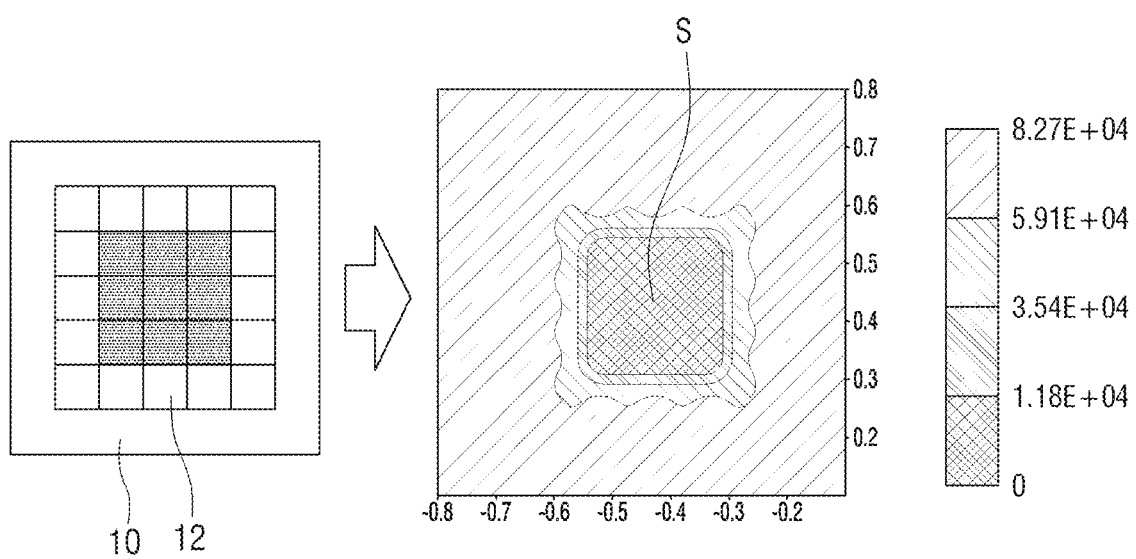

FIGS. 26A-26C show that some light sources of a lamp for a vehicle according to an exemplary embodiment of the present disclosure are controlled. Referring to FIGS. 26A-26C, when the light amount of at least one of the plurality of light sources 12 of the light source unit 10 is reduced or turned off, the shadow zone S may be formed in the beam pattern P as shown in FIG. 26A. However, as described above, the curvature, the thickness, the refractive index, or the like of the optical member may change due to the temperature change, and thus, the glare may occur in the shadow zone.

Accordingly, as shown in FIG. 26B, the light amount of the light sources within an area around the shadow zone of the area of the beam pattern P may be reduced. In other words, since the glare is formed by the light amount of the light sources disposed around the light source that is controlled for forming the shadow zone, the glare may be reduced by reducing the light amount of at least one light source adjacent to the controlled light source for forming the shadow zone. Further, when the glare reduction is insufficient by reducing the light amount of the adjacent light sources, the light amount of the reduced adjacent light sources may be further reduced or turned off as shown in FIG. 26C. In addition, the light amount of the controlled light source for forming the shadow zone may be further reduced or turned off. Accordingly, the light source unit 10 may be controlled to increase the shadow zone S of the beam pattern P. As a result, the beam pattern P and the shadow zone S may be efficiently formed as shown in FIG. 15 by controlling the light amount of the light source unit 10 due to temperature changes.

In concluding the detailed description, those skilled in the art will appreciate that many variations and modifications can be made to the exemplary embodiments without substantially departing from the principles of the present disclosure. Therefore, the disclosed exemplary embodiments of the present disclosure are used in a generic and descriptive sense only and not for purposes of limitation.

What is claimed is:

1. A lamp for a vehicle comprising:
a light source unit that generates light; and
an optical unit for guiding the light,
wherein the light source unit comprises a plurality of light sources arranged in a matrix shape,
wherein the optical unit comprises a plurality of optical members disposed in a traveling direction of the light,
wherein the light generated from the plurality of light sources passes through the optical unit to form a beam pattern,
wherein at least one of the plurality of light sources is turned off to form a shadow zone in the beam pattern, and at least one adjacent light source that is adjacent to the at least one light source forming the shadow zone is configured to generate a reduced amount of light, without being turned off, to expand the shadow zone and form an adjacent area of the shadow zone,
wherein the plurality of optical members comprise a first set of optical members and a second set of optical members,
wherein all of the first set of optical members are formed of a first material, and all of the second set of optical members are formed of a second material that is different from the first material, and
wherein the plurality of optical members comprise an even number of the second set of optical members formed of the second material, a half of the even number of the second set of optical members formed of the second material are light converging optical members and another half of the even number of the second set of optical members formed of the second material are light diverging optical members such that aberration due to thermal expansion of the light converging optical members is corrected by thermal expansion of the light diverging optical members.

2. The lamp for the vehicle of claim 1, wherein the plurality of light sources are disposed to be spaced apart from each other in the light source unit.

3. The lamp for the vehicle of claim 1, wherein the light source unit comprises a partition disposed between the plurality of light sources to separate the plurality of light sources from each other.

4. The lamp for the vehicle of claim 1, wherein each of the plurality of light sources comprises a chip for controlling a light amount and a phosphor for emitting the light.

5. The lamp for the vehicle of claim 1, wherein each of the plurality of light sources has a size of about 100 µm or less.

6. The lamp for the vehicle of claim 1, wherein a width of the light source unit is greater than a length of the light source unit.

7. The lamp for the vehicle of claim 6, wherein a ratio of the width and the length of the light source unit is about 4:1.

8. The lamp for the vehicle of claim 1, wherein a number of the plurality of light sources is about 1,000 or more.

9. The lamp for the vehicle of claim 1, wherein the beam pattern forms at least one of a low beam pattern, a high beam pattern, or a communication beam pattern.

10. The lamp for the vehicle of claim 1, wherein the light source unit is rotated about a central axis thereof and inclined at a predetermined angle.

11. The lamp for the vehicle of claim 10, wherein the predetermined angle is equal to or greater than about 0 degree and equal to or less than about 37 degrees.

12. The lamp for the vehicle of claim 1, wherein light generated from each of the plurality of light sources forms a pixel beam pattern included in the beam pattern, and
wherein a size of a pixel beam pattern generated by a light source disposed farther from a central axis of the light source unit is greater than a size of a pixel beam pattern generated by a light source disposed closer to the central axis of the light source unit.

13. The lamp for the vehicle of claim 1, wherein the beam pattern is formed corresponding to an image, which is an image formed by inverting a light emitting image of the light source unit vertically and horizontally.

14. The lamp for the vehicle of claim 1, wherein the optical unit further comprises a shield member for shielding a part of the light generated from the light source unit to allow a brightness of the beam pattern to become decreased as it moves away from a center of the beam pattern, and
wherein the shield member is disposed in at least one place between the plurality of optical members.

15. The lamp for the vehicle of claim 14, wherein the shield member is disposed near a middle of the optical unit.

16. The lamp for the vehicle of claim 14, wherein a largest optical member among the plurality of optical members is disposed adjacent to the shield member with respect to the traveling direction of the light.

17. The lamp for the vehicle of claim 14, wherein light from an outermost portion of the light source unit with respect to a central axis passes through a center of the shield member.

18. The lamp for the vehicle of claim 14, wherein each of the plurality of light sources generates a center light that passes through a center portion of an opening of the shield member, and a peripheral light that is spaced apart farthest from the center light and passes near a peripheral edge of an opening of the shield member, and
wherein a light source disposed farther from a central axis of the light source unit forms a smaller angle between the center light and the peripheral light than a light source disposed closer to the central axis of the light source unit.

19. The lamp for the vehicle of claim 1, wherein a portion of light generated from the light source unit is emitted to a largest optical member among the plurality of optical members, after passing the largest optical member, converges toward a central axis of the light, and passes a last optical member, and then forms parallel light.

20. The lamp for the vehicle of claim 19, wherein the portion of light has a largest angle with respect to the central axis among the light generated by the light source unit.

21. The lamp for the vehicle of claim 1, wherein the second set of optical members formed of the second material have at least one of thermal expansion or thermal contraction greater than the first set of optical members formed of the first material due to a temperature change.

22. The lamp for the vehicle of claim 1, wherein the second set of optical members is formed of plastic.

23. The lamp for the vehicle of claim 1, wherein the plurality of optical members comprise a first optical member closest to the light source unit, and
wherein an incident surface of the first optical member on which the light is incident is formed of any one of a spherical surface, an aspherical surface, and a flat surface.

24. The lamp for the vehicle of claim 23, wherein a ratio between a first length from the light source unit to the incident surface of the first optical member and a diameter of the first optical member is between 0 and 1.

25. The lamp for the vehicle of claim 14, wherein the plurality of optical members comprise a first optical member, a second optical member, a third optical member, a fourth optical member, a fifth optical member, and a sixth optical member along the traveling direction of the light generated from the light source unit, and
    wherein the shield member is disposed between the third optical member and the fourth optical member.

26. The lamp for the vehicle of claim 25, wherein light generated from a central axis of the light source unit is configured to:
    diverge away from the central axis of the light source unit while passing the first optical member, the second optical member, and the third optical member,
    converge toward the central axis of the light source unit by the fourth optical member and the fifth optical member, and
    pass the sixth optical member to be formed as parallel light.

27. The lamp for the vehicle of claim 1, wherein the light is shielded at an outer edge thereof using an optical member disposed closest to the light source unit and an optical member disposed farthest from the light source unit, among the plurality of optical members such that the resulting light is gradually dimmer from a center to the outer edge.

28. The lamp for the vehicle of claim 1, wherein the light source unit is controlled to form flail the shadow zone in the beam pattern, and a light amount of at least one adjacent light source forming the adjacent area of the shadow zone is reduced.

29. The lamp for the vehicle of claim 28, wherein the light source unit is controlled to expand the shadow zone.

* * * * *